US010659742B2

(12) United States Patent
Oto et al.

(10) Patent No.: US 10,659,742 B2
(45) Date of Patent: May 19, 2020

(54) IMAGE GENERATING APPARATUS AND IMAGE DISPLAY CONTROL APPARATUS

(71) Applicant: Sony Interactive Entertainment Inc., Tokyo (JP)

(72) Inventors: Tomohiro Oto, Tokyo (JP); Takayuki Shinohara, Tokyo (JP)

(73) Assignee: Sony Interactive Entertainment, Inc., Tokyo (JP)

( * ) Notice: Subject to any disclaimer, the term of this patent is extended or adjusted under 35 U.S.C. 154(b) by 61 days.

(21) Appl. No.: 15/748,474

(22) PCT Filed: Jun. 24, 2016

(86) PCT No.: PCT/JP2016/068873
§ 371 (c)(1),
(2) Date: Jan. 29, 2018

(87) PCT Pub. No.: WO2017/029885
PCT Pub. Date: Feb. 23, 2017

(65) Prior Publication Data
US 2018/0227558 A1 Aug. 9, 2018

(30) Foreign Application Priority Data
Aug. 18, 2015 (JP) .................................. 2015-160951

(51) Int. Cl.
*H04N 7/00* (2011.01)
*H04N 9/31* (2006.01)
(Continued)

(52) U.S. Cl.
CPC ............. *H04N 9/3185* (2013.01); *G06T 3/00* (2013.01); *G06T 3/005* (2013.01); *G06T 3/0043* (2013.01); *H04N 1/387* (2013.01); *H04N 5/265* (2013.01)

(58) Field of Classification Search
CPC .......... G06T 3/00; G06T 3/005; G06T 3/0043; G06T 15/20; G06T 17/20; H04N 9/3185
See application file for complete search history.

(56) References Cited

U.S. PATENT DOCUMENTS

| 7,959,307 | B1 | 6/2011 | Colucci |
| 2010/0001997 | A1 | 1/2010 | Narukawa |
| 2014/0132598 | A1* | 5/2014 | Narukawa ............... G06T 17/20 345/419 |

FOREIGN PATENT DOCUMENTS

| CN | 102096949 A | 6/2011 |
| CN | 104196282 A | 12/2014 |

(Continued)

OTHER PUBLICATIONS

Office Action for corresponding RU Application No. 2018109330, 11 pages, dated Dec. 14, 2018.

(Continued)

*Primary Examiner* — Clifford Hilaire
*Assistant Examiner* — Peet Dhillon
(74) *Attorney, Agent, or Firm* — Matthew B. Dernier, Esq.

(57) ABSTRACT

An image generating apparatus generates a panoramic image by transforming at least one divided area including a range onto which a scene viewed from an observation point is projected, out of eight divided areas obtained by dividing the surface of a sphere having at least a partial range onto which the scene is projected, with three planes that pass through the center of the sphere and are orthogonal to each other, into such an area that the number of pixels corresponding to mutually equal latitudes is progressively reduced toward higher latitudes, and placing the transformed area on a plane, and outputs the generated panoramic image.

9 Claims, 13 Drawing Sheets

(51) Int. Cl.
　　　*H04N 1/387*　　(2006.01)
　　　*H04N 5/265*　　(2006.01)
　　　*G06T 3/00*　　(2006.01)

(56) References Cited

FOREIGN PATENT DOCUMENTS

| CN | 104834176 A | 8/2015 |
|---|---|---|
| JP | 2003267295 A | 9/2003 |
| JP | 2010033573 A | 2/2010 |
| RU | 108651 U1 | 9/2011 |
| WO | 2008081961 A1 | 7/2008 |

OTHER PUBLICATIONS

International Preliminary Report on Patentability for corresponding PCT Application No. PCT/JP2016/068873, 9 pages, dated Feb. 20, 2018.
Office Action for corresponding AU Application No. 2016308980, 3 pages, dated Nov. 27, 2018.
Decision of Final Rejection for corresponding JP Application No. 2017-535279, 4 pages, dated Jan. 22, 2019.
Extended European Search Report for corresponding EP Application No. 16836877.7, 9 pages, dated Feb. 1, 2019.
Geoffrey Dutton: "Zenithial Orthotriangular Projection" Retrieved from the Internet: URL:https://pdfs.semanticscholar.org/6c54/ee67d936cee19a3aedbdeeb8452c3367cfd3.pdf [retrieved on Jan. 22, 2019] 19 pages, dated Jan. 1, 1991.
Gerald I Evenden: "Cartographic Projection Procedures—Release 4—Second Interim Report" Retrieved from the Internet: URL:https://download.osgeo.org/proj/proj.4.3.I2.pdf [retrieved on Jan. 22, 2019] 21 pages, dated Jan. 1, 2003.
Pascal Getreuer: "Linear Methods for Image Interpolation" Image Processing Online. vol. 1, 22 pages, dated Sep. 27, 2011.
Chamberlain Fong et al: "Warping Peirce Quincuncial Panoramas" Retrieved from the Internet: URL:https://arxiv.org/pdf/1011.3189v4 [retrieved on Jan. 22, 2019] 29 pages, dated Feb. 19, 2012.
International Search Report for corresponding PCT Application No. PCT/JP2016/068873, 3 pages, dated Jul. 19, 2016.
Office Action for corresponding JP Application No. JP2017-535279, 4 pages, dated Aug. 7, 2018.
Office Action for corresponding KR Application No. 10-2018-7007795, 11 pages, dated Jun. 18, 2019.
Examination report No. 2 for corresponding AU Application No. 2016308980, 4 pages, dated Jul. 11, 2019.
Office Action for corresponding JP Application No. 2017-535279, 5 pages, dated Dec. 17, 2019.

* cited by examiner

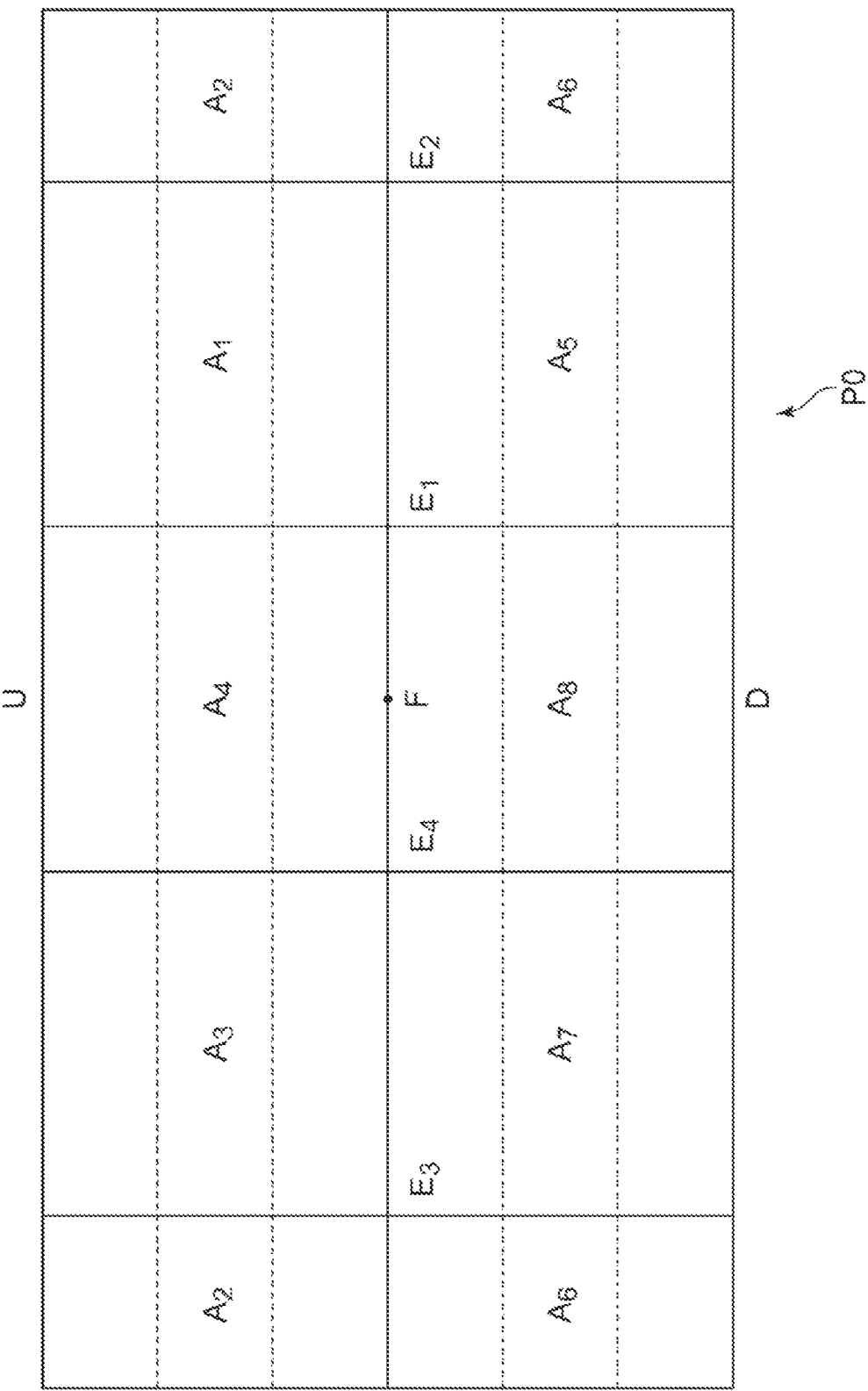

| 11 | 10 | 9  | 8  | 7  | 6  | 5  | 4  | 3  | 2  | 1 |
|----|----|----|----|----|----|----|----|----|----|---|
| 12 | 11 | 10 | 9  | 8  | 7  | 6  | 5  | 4  | 3  | 2 |
| 13 | 12 | 11 | 10 | 9  | 8  | 7  | 6  | 5  | 4  | 3 |
| 14 | 13 | 12 | 11 | 10 | 9  | 8  | 7  | 6  | 5  | 4 |
| 15 | 14 | 13 | 12 | 11 | 10 | 9  | 8  | 7  | 6  | 5 |
| 16 | 15 | 14 | 13 | 12 | 11 | 10 | 9  | 8  | 7  | 6 |
| 17 | 16 | 15 | 14 | 13 | 12 | 11 | 10 | 9  | 8  | 7 |
| 18 | 17 | 16 | 15 | 14 | 13 | 12 | 11 | 10 | 9  | 8 |

FIG.9

|   | U₁ | U₂ |   |   |   |   |   |   | B₁ |
|---|---|---|---|---|---|---|---|---|---|
| 1 | 1 | 1 | 1 | 2 | 3 | 4 | 5 | 6 | 7 | 8 |
| 2 | 2 | 2 | 2 | 2 | 3 | 4 | 5 | 6 | 7 | 8 |
| 3 | 3 | 3 | 3 | 3 | 3 | 4 | 5 | 6 | 7 | 8 |
| 4 | 4 | 4 | 4 | 4 | 4 | 4 | 5 | 6 | 7 | 8 |
| 5 | 5 | 5 | 5 | 5 | 5 | 5 | 5 | 6 | 7 | 8 |
| 6 | 6 | 6 | 6 | 6 | 6 | 6 | 6 | 6 | 7 | 8 |
| 7 | 7 | 7 | 7 | 7 | 7 | 7 | 7 | 7 | 7 | 8 |
| 8 | 8 | 8 | 8 | 8 | 8 | 8 | 8 | 8 | 8 | 8 |

F        R

IMAGE GENERATING APPARATUS AND IMAGE DISPLAY CONTROL APPARATUS

TECHNICAL FIELD

The present invention relates to an image generating apparatus for generating a panoramic image, an image display control apparatus for displaying a panoramic image, an image generating method, a program, and image data.

BACKGROUND ART

Equidistant cylindrical projection is known as an image format for a panoramic image in which a whole sky scene as viewed from an observation point is projected onto a two-dimensional plane. According to this projection, an omni-azimuth scene that spans 360 degrees horizontally and spans 180 degrees vertically is included in a rectangular shape of image data which has an aspect ratio of 1:2. By using such a panoramic image, it is possible to realize a panorama viewer for displaying a scene in any desired direction depending on how the user manipulates the direction of its viewpoint, for example.

SUMMARY

Technical Problem

According to the above-described image format of the equidistant cylindrical projection, the entire upper side of the image corresponds to one point at the zenith (directly above), and the entire lower side thereof corresponds to one point at the nadir (directly below). Therefore, in regions near the upper side and the lower side (regions including scenes directed nearly directly above and directly below the observation point), the amount of information per pixel is extremely small compared with regions in the middle of the image which include scenes at a height near the horizon, resulting a lot of wasteful information.

The present invention has been made in view of the above situation. It is an object of the present invention to provide an image generating apparatus, an image display control apparatus, an image generating method, a program, and image data which are capable of reducing wasteful information contained in a panoramic image.

Solution to Problem

An image generating apparatus according to the present invention includes a panoramic image generating unit configured to generate a panoramic image by transforming at least one divided area including a range onto which a scene viewed from an observation point is projected, out of eight divided areas obtained by dividing the surface of a sphere having at least a partial range onto which the scene is projected, with three planes that pass through the center of the sphere and are orthogonal to each other, into such an area that the number of pixels corresponding to mutually equal latitudes is progressively reduced toward higher latitudes, and placing the transformed area on a plane, and an image output unit configured to output the generated panoramic image.

An image display control apparatus according to the present invention includes an acquiring unit configured to acquire a panoramic image by transforming at least one divided area including a range onto which a scene viewed from an observation point is projected, out of eight divided areas obtained by dividing the surface of a sphere having at least a partial range onto which the scene is projected, with three planes that pass through the center of the sphere and are orthogonal to each other, into such an area that the number of pixels corresponding to mutually equal latitudes is progressively reduced toward higher latitudes, and placing the transformed area on a plane, and a rendering unit configured to render a display image representing a scene in a predetermined visual field range on the basis of the acquired panoramic image, and control a display apparatus to display the rendered display image on a screen thereof.

A method of generating an image according to the present invention includes a step of generating a panoramic image by transforming at least one divided area including a range onto which a scene viewed from an observation point is projected, out of eight divided areas obtained by dividing the surface of a sphere having at least a partial range onto which the scene is projected, with three planes that pass through the center of the sphere and are orthogonal to each other, into such an area that the number of pixels corresponding to mutually equal latitudes is progressively reduced toward higher latitudes, and placing the transformed area on a plane, and a step of outputting the generated panoramic image.

A program according to the present invention enables a computer to function as means for generating a panoramic image by transforming at least one divided area including a range onto which a scene viewed from an observation point is projected, out of eight divided areas obtained by dividing the surface of a sphere having at least a partial range onto which the scene is projected, with three planes that pass through the center of the sphere and are orthogonal to each other, into such an area that the number of pixels corresponding to mutually equal latitudes is progressively reduced toward higher latitudes, and placing the transformed area on a plane, and means for outputting the generated panoramic image. The program may be provided as being stored in a nontemporal information storage medium that can be read by a computer.

Image data according the present invention represents a transformed area that is transformed from at least one divided area including a range onto which a scene viewed from an observation point is projected, out of eight divided areas obtained by dividing the surface of a sphere having at least a partial range onto which the scene is projected, with three planes that pass through the center of the sphere and are orthogonal to each other, such that the number of pixels corresponding to mutually equal latitudes is progressively reduced toward higher latitudes, and that is placed on a plane.

BRIEF DESCRIPTION OF DRAWINGS

FIG. 2 is a diagram depicting a panoramic image according to equidistant cylindrical projection.

FIG. 9 is a diagram depicting another example of a pixel layout of a panoramic image which is of a rectangular shape.

DESCRIPTION OF EMBODIMENT

An embodiment of the present invention will be described in detail below on the basis of the drawings.

An image generating apparatus according to the present embodiment generates a panoramic image of an image format, which is different from an equidistant cylindrical projection, including a whole sky scene as viewed from an observation point. The panoramic image generated by the image generating apparatus according to the embodiment will hereinafter be referred to as a panoramic image P. The panoramic image P is represented by two-dimensional (planar) image data including the whole sky scene. The whole sky signifies all azimuths that span 360 degrees horizontally (in leftward and rightward directions) and span 180 degrees vertically (in upward and downward directions) from the zenith to the nadir as seen from the observation point.

Three examples of the image format of the panoramic image P will be described below in comparison with a panoramic image according to the equidistant cylindrical projection. The first example of the panoramic image P will first be described below. The panoramic image P according to the first example will hereinafter be referred to as a first panoramic image P1. The panoramic image generated according to the equidistant cylindrical projection will hereinafter be referred to as an equidistant cylindrical image P0.

Figure 1A:
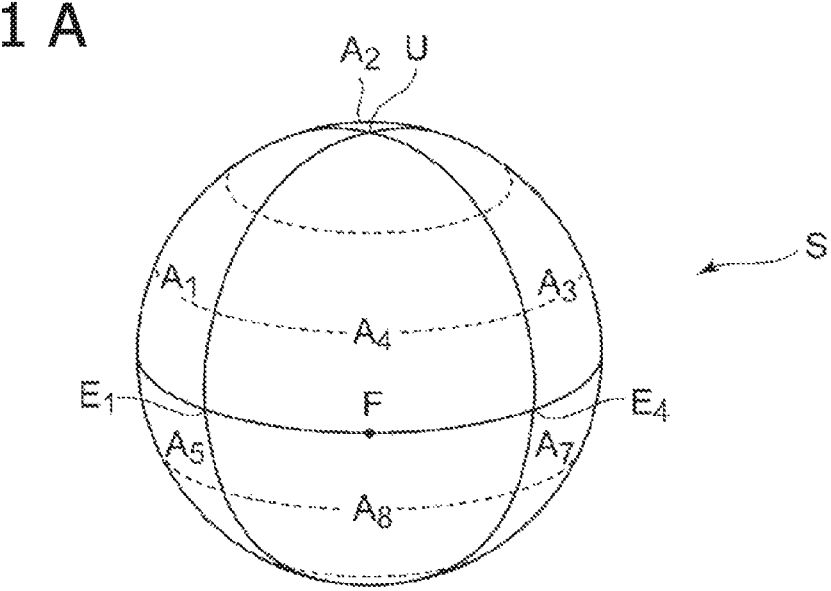
FIG. 1A is a perspective front view of a hypothetical sphere onto which there is projected a whole sky scene that is contained in a panoramic image according to a first example generated by an image generating apparatus according to an embodiment of the present invention.
Figure 1B:
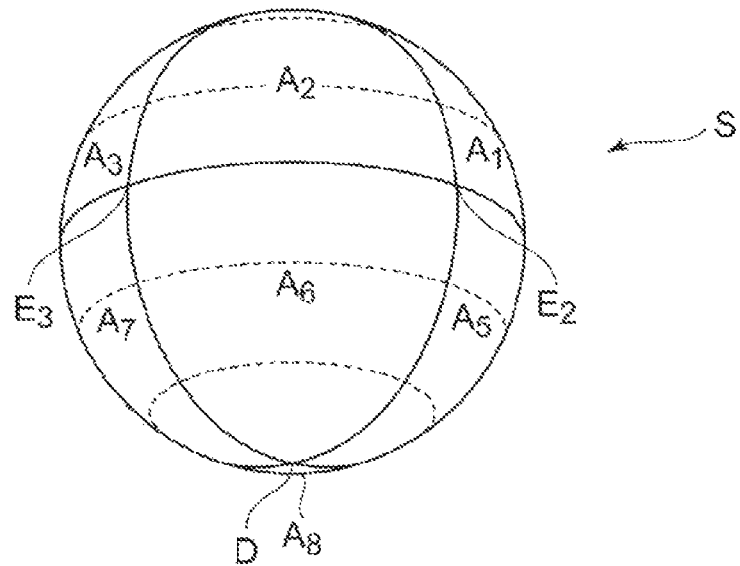
FIG. 1B is a perspective rear view of the hypothetical sphere onto which there is projected the whole sky scene contained in the panoramic image according to the first example.
Figure 1C:
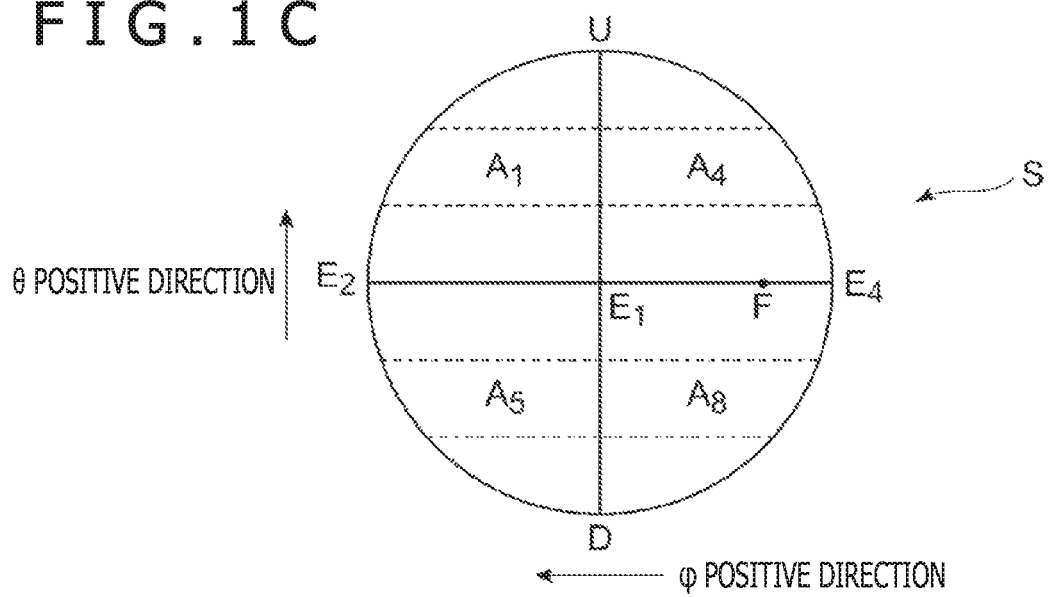
FIG. 1C is a front elevational view of the hypothetical sphere onto which there is projected the whole sky scene contained in the panoramic image according to the first example.

The whole sky scene as viewed from the observation point is projected onto a hypothetical sphere around the position of the observation point. The hypothetical sphere onto which the whole sky scene is projected is referred to as a sphere S. FIGS. 1A through 1C depict the sphere S, FIG. 1A being a perspective front view as viewed from above, FIG. 1B a perspective rear view as viewed from below, and FIG. 1C a front elevational view. The position of a point $E_1$ to be described later is in a frontal direction. On the surface of the sphere S, a point corresponding to the zenith (directly above the observation point) is referred to as a point U, and a point corresponding to the nadir (directly below the observation point) is referred to as a point D. The point U and the point D are on opposite sides of the sphere S across the center thereof. A great circle of the sphere S that is perpendicular to a straight line UD corresponds to the astronomical horizon as viewed from the observation point, and the scene viewed horizontally from the observation point is projected onto the great circle. A plane including the great circle of the sphere S that is perpendicular to the straight line UD will be referred to as a horizontal plane. A plane that is orthogonal to the horizontal plane will be referred to as a vertical plane.

According to the first example, a position on the surface of the sphere S is expressed by a coordinate system of latitudes $\theta$ and longitudes $\phi$. A point F on the horizontal plane is assumed to be the origin ($\theta=0$, $\phi=0$) of the coordinate system. The latitude $\theta$ of a certain point on the sphere S is expressed as an angle formed between a straight line interconnecting that point and the center of the sphere S and the horizontal plane. The longitude $\phi$ of the point is expressed by an angle formed between a great circle of the sphere S that includes that point, the point U, and the point D and a great circle of the sphere S that includes the point F, the point U, and the point D. As depicted in FIG. 1C, the direction from the horizontal plane toward the zenith is referred to as a positive direction of latitudes $\theta$. Therefore, the latitude $\theta$ of the point U is defined as $\pi/2$, and the latitude $\theta$ of the point D as $-\pi/2$. The right-hand direction from the point F as it is viewed from the observation point is referred to as a positive direction of longitudes $\phi$.

Four points on the sphere S that are angularly spaced by 90 degrees along the horizontal plane are referred to as points $E_1$ through $E_4$. Specifically, the latitudes $\theta$ of these four points are all 0, and the longitudes $\phi$ of the points $E_1$, $E_2$, $E_3$, and $E_4$ are $\pi/4$, $3\pi/4$, $5\pi/4$ (or $-3\pi/4$), $-\pi/4$, respectively. For example, if the observer at the observation point faces in the direction of the point $E_1$, then the point $E_2$ is in the right-hand direction of the observer, the point $E_3$ is in the backward direction of the observer, and the point $E_4$ is in the left-hand direction of the observer. The point $E_1$ and the point $E_3$ are on opposite sides of the sphere S across the center thereof, and the point $E_2$ and the point $E_4$ are on opposite sides of the sphere S across the center thereof. A straight line $E_1E_3$ and a straight line $E_2E_4$ are orthogonal to each other on the horizontal plane. In FIGS. 1A through 1C, a line of latitude at $\theta=0$ that is included in the horizontal plane and four lines of longitude that pass through the points $E_1$ through $E_4$ are indicated by the solid lines. Several lines of latitude are indicated by the broken lines.

Furthermore, eight areas of the surface of the sphere S divided by three planes that pass through the center of the sphere S and that are orthogonal to each other are expressed as divided areas $A_1$ through $A_8$. According to the first example, the three orthogonal planes are the horizontal plane including the points $E_1$ through $E_4$, a vertical plane including the points $E_1$, $E_3$, U, and D, and another vertical plane including the points $E_2$, $E_4$, U, and D. Specifically, the area surrounded by a line of longitude interconnecting the points U and $E_1$, a line of latitude interconnecting the points $E_1$ and $E_2$, and a line of longitude interconnecting the points $E_2$ and U is defined as the divided area $A_1$. Similarly, the area surrounded by the points U, $E_2$, and $E_3$ is defined as the divided area $A_2$, the area surrounded by the points U, $E_3$, and $E_4$ as the divided area $A_3$, the area surrounded by the points U, $E_4$, and $E_1$ as the divided area $A_4$, the area surrounded by the points D, $E_1$, and $E_2$ as the divided area $A_5$, area surrounded by the points D, $E_2$, and $E_3$ as the divided area $A_6$, the area surrounded by the points D, $E_3$, and $E_4$ as the divided area $A_7$, and the area surrounded by the points D, $E_4$, and $E_1$ as the divided area $A_8$. Each of these divided areas $A_1$ through $A_8$ is an area surrounded by three lines of latitude and longitude each having a length corresponding to ¼ of the circumference of a great circle of the sphere S, and their sizes and shapes are equal to each other.

FIG. 2 depicts the equidistant cylindrical image P0 including a scene projected onto the sphere S. The point F at the longitude $\phi=0$ is at the center of the equidistant cylindrical image P0. According to the equidistant cylindrical projection, the scene projected onto the surface of the sphere S is transformed into the equidistant cylindrical image P0 which is of a rectangular shape having an aspect ratio of 1:2 in order to keep vertical and horizontal positional relationships as viewed from the observation point. In the equidistant cylindrical image P0, the lines of latitude of the sphere S extend parallel to each other in the horizontal directions, and the lines of longitude of the sphere S extend parallel to each other in the vertical directions, with all the lines of latitude and all the lines of longitude being orthogonal to each other. The divided areas $A_1$ through $A_8$ are transformed into respective square-shaped areas. The equidistant cylindrical image P0 has an upper side which corresponds in its entirety to the point U and a lower side which corresponds in its entirety to the point D. Because of the above transformation, areas positioned in the vicinity of the points U and D on the surface of the sphere S (high-latitude areas) are expanded horizontally in the equidistant cylindrical image P0. Therefore, in the vicinity of the upper and lower sides of the equidistant cylindrical image P0, the amount of information contained per unit pixel is reduced compared with low-latitude areas in the middle of the image.

Figure 3:
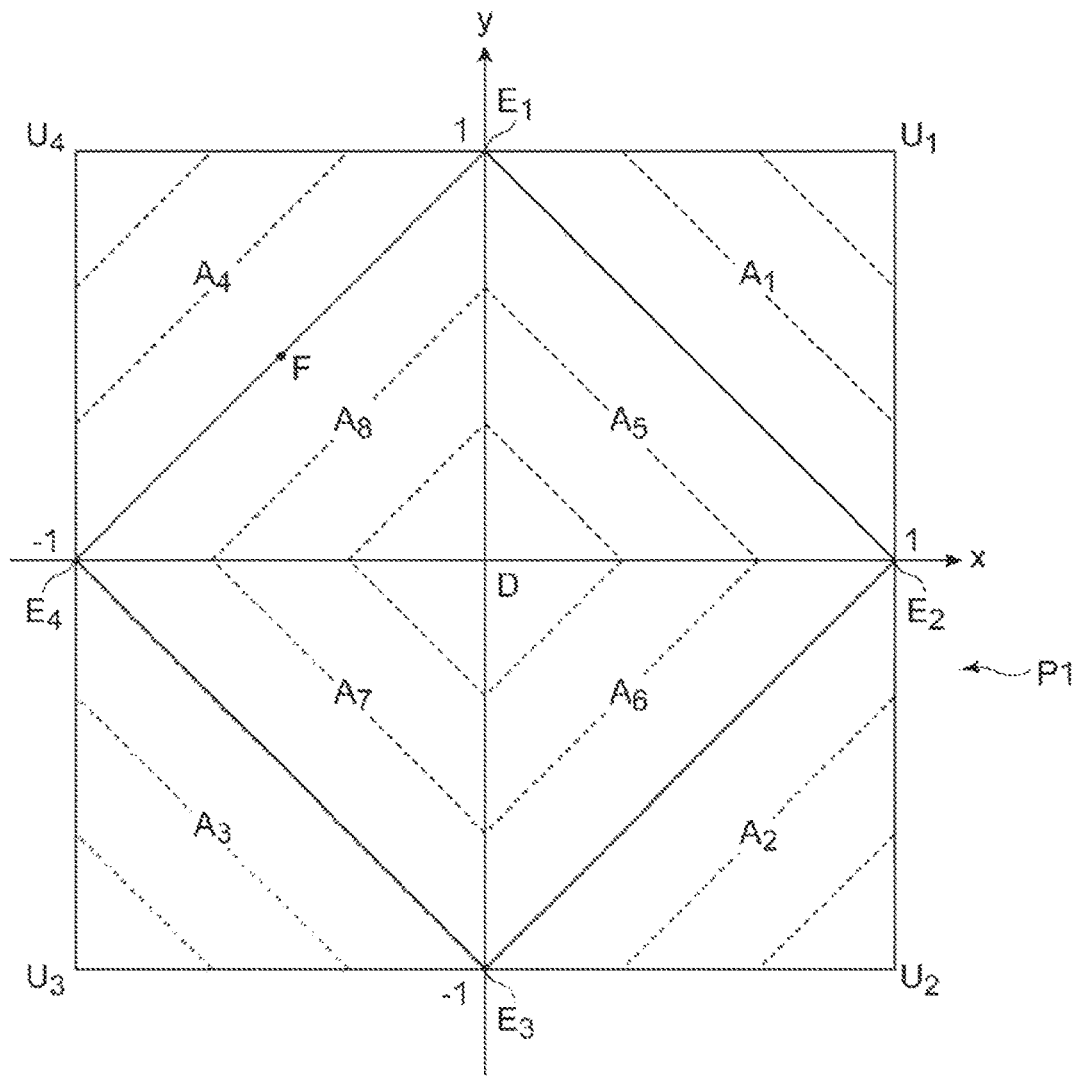
FIG. 3 is a diagram depicting the panoramic image according to the first example.

FIG. 3 depicts the first panoramic image P1 including a scene projected onto the sphere S. As depicted in FIG. 3, the first panoramic image P1 is of a square shape as a whole. The center of the square shape corresponds to the point D, and the point U which is opposite to the point D on the sphere S corresponds to four corners of the square shape. In other words, the four vertexes of the first panoramic image P1 correspond to the single point U on the sphere S. The midpoint of the upper side of the square shape corresponds to the point $E_1$, the midpoint of the right side thereof to the point $E_2$, the midpoint of the lower side thereof to the point $E_3$, and the midpoint of the left side thereof to the point $E_4$. Of the four vertexes of the first panoramic image P1 which correspond to the single point U on the sphere S, the upper right vertex is defined as a point $U_1$, the lower right vertex as a point $U_2$, the lower left vertex as a point $U_3$, and the upper left vertex as a point $U_4$.

A line of latitude at $\theta=0$ on the sphere S forms a square $E_1E_2E_3E_4$ in the first panoramic image P1, where the midpoints of the four sides serve as the vertexes of the square and the point D serves as the center of the square. Lines of latitude at $\theta<0$ form squares in the first panoramic image P1, where they make 90-degree bends at positions intersecting with straight lines $E_1D$, $E_2D$, $E_3D$, and $E_4D$ and the point D serves as the centers of the squares. On the other hand, lines of latitude at $\theta>0$ are divided into four squares $E_1U_1E_2D$, $DE_2U_2E_3$, $U_4E_1DE_4$, and $E_4DE_3U_3$ that are provided by dividing the first panoramic image P1 into four pieces. These four squares correspond to respective four areas obtained when the surface of the sphere S is divided into four pieces by two vertical planes that are orthogonal to each other. In each of these squares, lines of latitude (i.e., lines where planes orthogonal to the two vertical planes and the sphere S cross each other) are juxtaposed parallel to a diagonal line of the square. Lines of longitude on the sphere S extend radially from the point D at the center in the first panoramic image P1, bend at positions where they intersect with the line of latitude at $\theta=0$, and extend to either ones of the squares that correspond to the point U.

Each of divided areas $A_1$ through $A_8$ that are obtained by dividing the surface of the sphere S into eight pieces is transformed into an area shaped as a rectangular equilateral triangle in the first panoramic image P1. In the first panoramic image P1, each of the divided areas is transformed into a shape relatively close to a shape on the original spherical plane compared with the equidistant cylindrical image P0 where each divided area is transformed into a square shape. Therefore, the difference between the amount of information contained per unit pixel in high-latitude areas and the amount of information contained per unit pixel in low-latitude areas is reduced compared with the equidistant cylindrical image P0. Hereinafter, areas in a panoramic image P that are converted from the divided areas will be referred to as transformed areas. For the convenience of illustration, the individual transformed areas in the panoramic image P are denoted by the same reference symbols as those of the corresponding divided areas on the sphere S. For example, a transformed area in the first panoramic image P1 which is obtained by transforming the divided area $A_1$ on the sphere S is referred to as a transformed area $A_1$.

The associated relationship between positional coordinates on the surface of the sphere S and positional coordinates in the first panoramic image P1 will be described below. It is assumed that the positional coordinates in the first panoramic image P1 are represented by an orthogonal coordinate system where the x-axis extends in the horizontal directions, the y-axis extends in the vertical directions, and the origin is located at the central position as depicted in FIG. 3. In the orthogonal coordinate system, the right side of the first panoramic image P1 is indicated by x=1, the left side thereof by x=−1, the upper side thereof by y=1, and the lower side thereof by y=−1.

In this case, a latitude $\theta$ and a longitude $\phi$ on the surface of the sphere S are expressed by the following equations using variables u, v, and a:

$$\begin{cases} \theta = (u+v-1) \cdot \dfrac{\pi}{2} \\ \phi = \dfrac{u-v}{1-|u+v-1|} \cdot \dfrac{\pi}{4} + a \end{cases} \quad \text{[Equation 1]}$$

where u, v, a are expressed by the following equations depending on positional coordinates (x, y) in the first panoramic image P1:

Transformed areas $A_1$ and $A_5 (x \geq 0, y \geq 0)$: [Equation 2]

$$u = x, \quad v = y, \quad a = \frac{\pi}{2}$$

Transformed areas $A_2$ and $A_6 (x \geq 0, y \leq 0)$:

$$u = -y, \quad v = x, \quad a = \pi$$

Transformed areas $A_3$ and $A_7 (x \leq 0, y \leq 0)$:

$$u = -x, \quad v = -y, \quad a = -\frac{\pi}{2}$$

Transformed areas $A_4$ and $A_8 (x \leq 0, y \geq 0)$:

$$u = y, \quad v = -x, \quad a = 0.$$

The associated relationship between positions on the sphere S and positions in the first panoramic image P1 is defined by these equations. As can be understood from these equations, latitudes θ in each of the divided areas are linearly related to both x and y.

Except the points (x=1, x=−1, y=1, y=−1) on the outer circumference of the first panoramic image P1, the positional coordinates on the sphere S and the positional coordinates in the first panoramic image P1 are held in one-to-one correspondence with each other. Furthermore, pixels that are adjacent to each other in the first panoramic image P1 correspond to areas that are adjacent to each other in the sphere S. In other words, although there are locations where lines of latitude and lines of longitude bend in the first panoramic image P1, discrete areas that are separate from each other on the sphere S are not transformed such that they are adjacent to each other in the first panoramic image P1. The points on the outer circumference of the first panoramic image P1 are contiguous, on the sphere S, to locations on corresponding same sides in case each side of the square shape is folded back on itself about the midpoint. For example, the n-th pixel from the left end and the n-th pixel from the right end of the upper side of the square shape correspond to adjacent areas on the sphere S.

In the equidistant cylindrical image P0, the amount of information per unit pixel is the largest in low-latitude areas (middle areas of the image). If the number of pixels in the vertical directions of the equidistant cylindrical image P0 is indicated by 2N, then the number of pixels in the horizontal directions thereof is indicated by 4N, so that the number of pixels corresponding to a visual field range of 90 degrees (e.g., a range from the point $E_1$ to the point $E_2$) on the horizontal plane is N. In contrast, in the first panoramic image P1 where the number of pixels in the vertical directions is indicated by 2N, though the pixels corresponding to the visual field range of 90 degrees on the horizontal plane are arranged obliquely as along a straight line $E_1 E_2$ in FIG. 3 for example, the number of those pixels is N as with the equidistant cylindrical image P0. Therefore, the first panoramic image P1 is able to provide an essentially equivalent image quality in low-latitude areas compared with the equidistant cylindrical image P0 that has the same number of pixels in the vertical directions. In a visual field range of 180 degrees along the vertical directions from the zenith (the point U) via the horizontal plane to the nadir (the point D), the number of pixels corresponding to this visual field range of the equidistant cylindrical image P0 is in agreement with the number 2N of pixels in the vertical directions of the image. In first panoramic image P1, in contrast, the visual field range corresponds to a route from the point $U_1$ via the point $E_1$ to the point D in FIG. 3, for example, so that the number of pixels corresponding to the visual field range is represented by (2N−1) which is produced by subtracting 1 from the number 2N of pixels of one side of the first panoramic image P1. Here, 1 is subtracted because the pixel at the position of the point $E_1$ is an endpoint of a straight line $U_1 E_1$ and also an endpoint of a straight line $E_1 D$ and hence is shared by these end points. At any rate, since the number of pixels in the vertical directions of the first panoramic image P1 is essentially the same as with the equidistant cylindrical image P0, the number of pixels corresponding to a visual field range in the vertical directions of the first panoramic image P1 is able to offer an essentially equivalent resolution. At higher latitudes, the number of pixels of the first panoramic image P1 decreases. However, as the equidistant cylindrical image P0 suffers a lot of wasteful information in high-latitude areas, the image quality in high-latitude areas of the first panoramic image P1 is almost not degraded compared with the equidistant cylindrical image P0. In other words, the first panoramic image P1 is comparable in terms of image quality to the equidistant cylindrical image P0 which as the same number of pixels in the vertical directions as the first panoramic image P1 throughout the whole sky.

Providing the first panoramic image P1 and the equidistant cylindrical image P0 have the same number of pixels in the vertical directions, the number of pixels in the horizontal directions of the first panoramic image P1 is exactly one-half of that of the equidistant cylindrical image P0. Therefore, on the whole, the first panoramic image P1 offers an image quality essentially equivalent to that of the equidistant cylindrical image P0 with one-half of the number of pixels. Consequently, using the first panoramic image P1, it is possible to reduce the image data size without a loss of image quality compared with the equidistant cylindrical image P0. In addition, the first panoramic image P1 makes it possible to achieve a higher image resolution without involving an increase in the image data size compared with the equidistant cylindrical image P0. Furthermore, when a panoramic image is to be generated as a moving image, the frame rate can be increased and the processing burden required to encode and decode the moving image can be reduced. Moreover, when a panoramic image is to be displayed as a three-dimensional image, image data including two panoramic images for the left and right eyes can be provided with an equivalent number of pixels to one equidistant cylindrical image P0.

Next, the second example of the image format of the panoramic image P in the second embodiment will be described below. The panoramic image P according to the second example will hereinafter be referred to as a second panoramic image P2. According to the second example, for transforming the positions on the sphere S into the positions in the second panoramic image P2, two hemispheres provided by dividing the surface of the sphere S into two halves are transformed using coordinate systems that are different from each other. The definition of positional coordinates on the sphere S according to the second example will be described below with reference to FIGS. 4A through 4D.

Figure 4A:
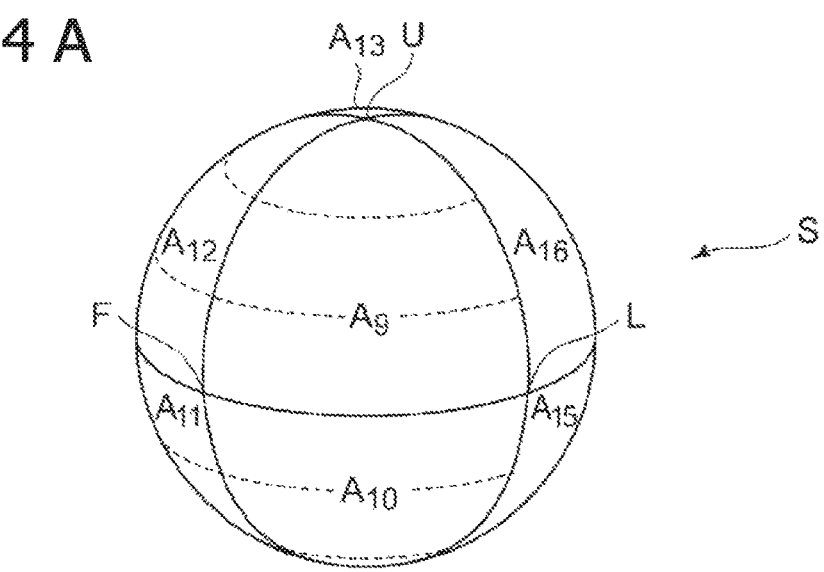
FIG. 4A is a perspective front view of a hypothetical sphere onto which there is projected a whole sky scene that is contained in a panoramic image according to a second example generated by the image generating apparatus according to the embodiment of the present invention.
Figure 4B:
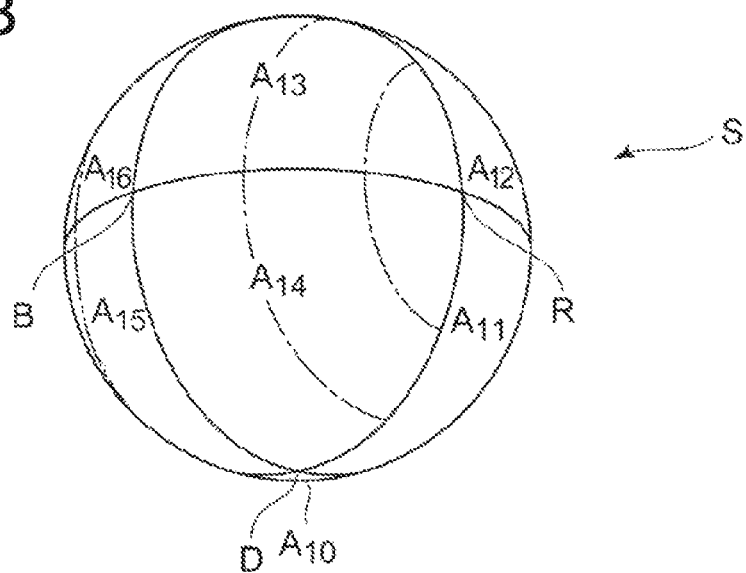
FIG. 4B is a perspective rear view of the hypothetical sphere onto which there is projected the whole sky scene contained in the panoramic image according to the second example.
Figure 4C:
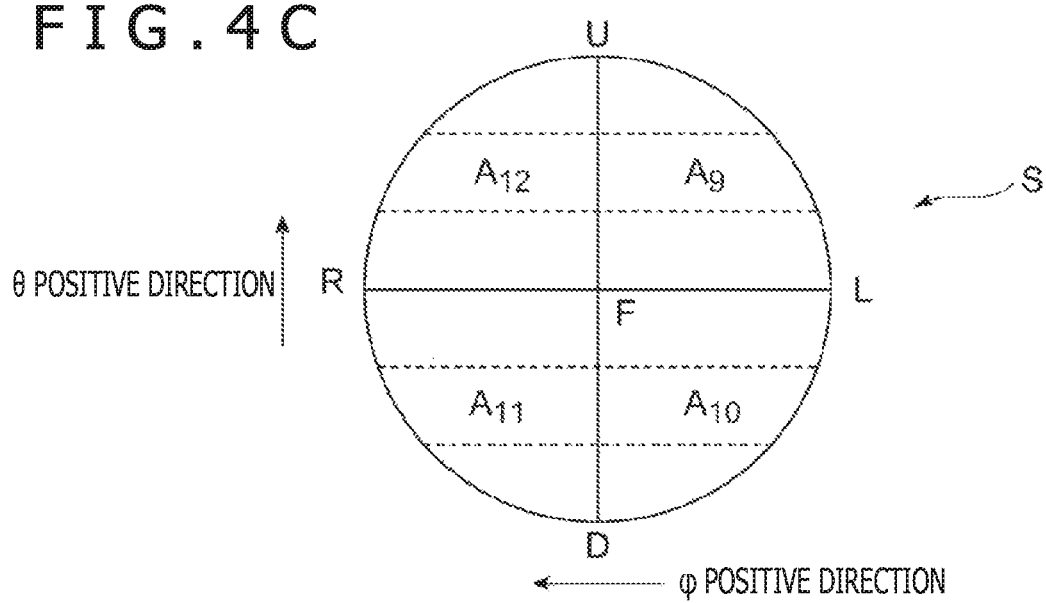
FIG. 4C is a front elevational view of the hypothetical sphere onto which there is projected the whole sky scene contained in the panoramic image according to the second example.
Figure 4D:
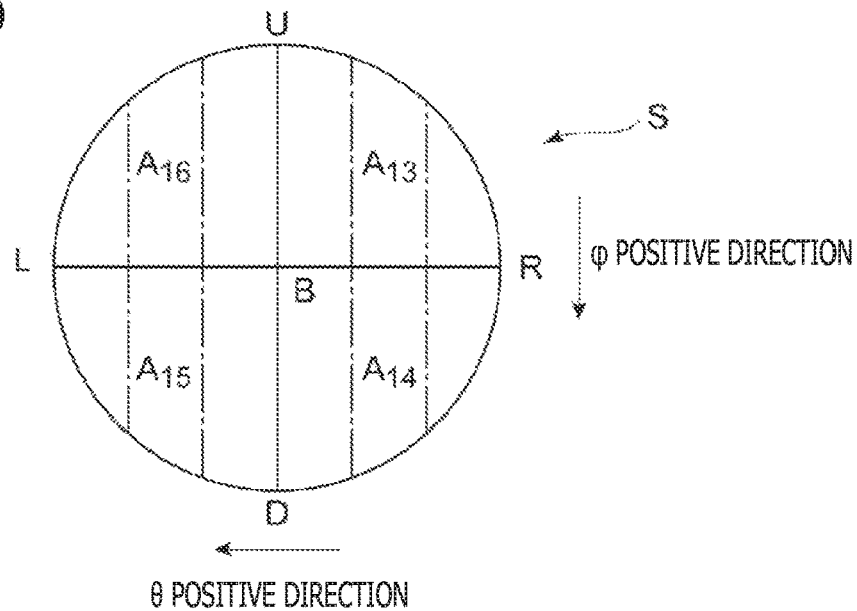
FIG. 4D is a rear elevational view of the hypothetical sphere onto which there is projected the whole sky scene contained in the panoramic image according to the second example.

FIG. 4A is a perspective front view of the sphere S as viewed from above. FIG. 4B is a perspective rear view of the sphere S as viewed from below. FIG. 4C is a front elevational view of the sphere S and FIG. 4D is a rear elevational view of the sphere S. The position of the point F is in a frontal direction. In the second example, as is the case with FIGS. 1A through 1C, a point corresponding to the zenith is referred to as a point U, and a point corresponding to the nadir is referred to as a point D. Four points on the sphere S that are angularly spaced by 90 degrees along the horizontal plane are referred to as points F, L, B, and R. When the observer at the center (observation point) of the sphere S faces in the direction of the point F (frontal direction), the right-hand direction points to the point R, the backward direction to the point B, and the left-hand direction to the point L.

With respect to the frontal half of the sphere S, i.e., the range thereof depicted in FIG. 4C, the positional coordinates are defined by the similar latitudes θ and longitudes φ to the first example described above. In other words, the lines of latitude extend parallel to the horizontal plane, and the lines of longitude represent the circumference of great circles of the sphere S that pass through the point U and the point D. The hemispherical surface of the frontal half of the sphere S will hereinafter be referred to as a frontal region, and the coordinate system that indicates positions in the frontal region as a frontal coordinate system. In FIGS. 4A and 4C, several lines of latitude are indicated by broken lines in the frontal region. In the frontal coordinate system, the point F is assumed to be the origin (θ=0, φ=0), and, as indicated in FIG. 4C by the arrows, the direction from the point F toward the zenith (point U) is assumed to be a positive direction of latitudes θ, and the direction from the point F toward the point R is assumed to be a positive direction of longitudes φ. As with the first example, the point U is defined as θ=π/2 and the point D as θ=−π/2. Furthermore, the point R is defined as θ=0, φ=π/2, and the point L as θ=0, φ=−π/2.

With respect to the back half of the sphere S, i.e., the range thereof depicted in FIG. 4D, latitudes θ and longitudes φ are defined in different directions from those in the frontal region. Specifically, latitudes θ and longitudes φ are defined in directions that are 90 degrees inclined to those in the frontal region. The lines of latitude represent the circumference of cross sections of the sphere S that are perpendicular to a straight line LR, and the lines of longitude represent the circumference of great circles of the sphere S that pass through the point L and the point R. The hemispherical surface of the back half of the sphere S will hereinafter be referred to as a back region, and the coordinate system that indicates positions in the back region as a back coordinate system. In FIGS. 4B and 4D, several lines of latitude in the back region defined by the back coordinate system are indicated by dot-and-dash lines. As depicted in FIG. 4D, in the back coordinate system, the lines of latitude extend parallel to a straight line UD (i.e., orthogonal to the lines of latitude in the frontal coordinate system) as viewed from behind the sphere S. In the back coordinate system, the point B is assumed to be the origin (θ=0, φ=0), and, as indicated by the arrows, the direction from the point B toward the point L is assumed to be a positive direction of latitudes θ, and the direction from the point B toward the point D is assumed to be a positive direction of longitudes φ. Consequently, the point U, the point L, the point D, and the point R that are positioned on the boundary between the frontal region and the back region are expressed by positional coordinates in the back coordinate system that are different from those in the frontal coordinate system. Specifically, in the back coordinate system, the point L is defined as θ=π/2 and the point R as θ=−π/2. Furthermore, the point D is defined as θ=0, φ=π/2, and the point U as θ=0, φ=−π/2.

Furthermore, eight areas of the surface of the sphere S divided by three planes that pass through the center of the sphere S and that are orthogonal to each other are expressed as divided areas $A_9$ through $A_{16}$. The three orthogonal planes that are orthogonal to each other are a horizontal plane including the point F, the point L, the point B, and the point R, a vertical plane including the point U, the point F, the point D, and the point B, and another vertical plane including the point U, the point L, the point D, and the point R. Specifically, the area surrounded by the point U, the point F, and the point L is defined as the divided area $A_9$, the area surrounded by the point D, the point F, and the point L as the divided area $A_{10}$, the area surrounded by the point D, the point R, and the point F as the divided area $A_{11}$, the area surrounded by the point U, the point F, and the point R as the divided area $A_{12}$, the area surrounded by the point U, the point B, and the point R as the divided area $A_{13}$, area surrounded by the point D, the point B, and the point R as the divided area $A_{14}$, the area surrounded by the point D, the point L, and the point B as the divided area $A_{15}$, and the area surrounded by the point U, the point B, and the point L as the divided area $A_{16}$. Each of these divided areas $A_9$ through $A_{16}$ is an area surrounded by three lines of latitude and longitude each having a length corresponding to ¼ of the circumference of a great circle of the sphere S, and their sizes and shapes are equal to each other.

Figure 5:
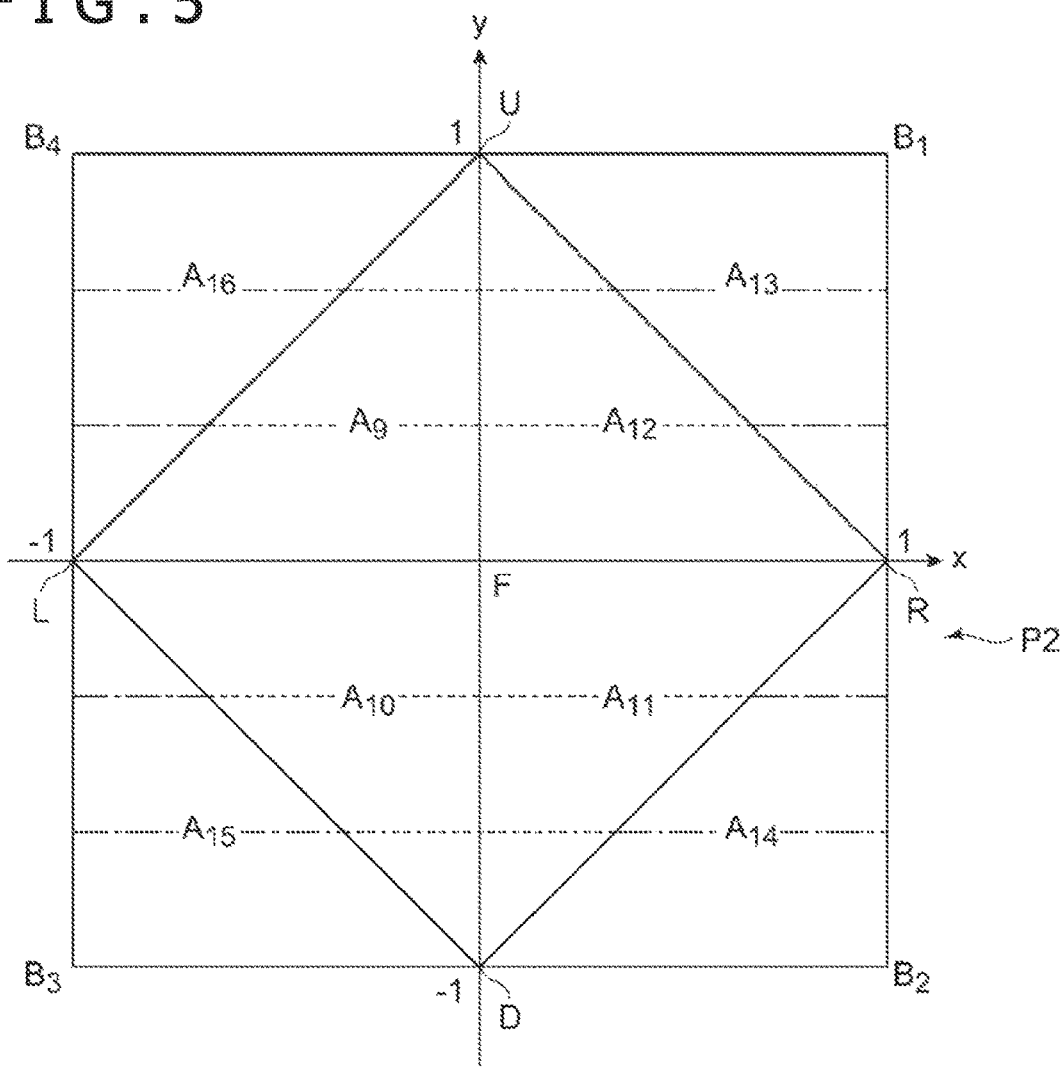
FIG. 5 is a diagram depicting the panoramic image according to the second example.

FIG. 5 depicts the second panoramic image P2 including a scene projected onto the sphere S. As depicted in FIG. 5, the second panoramic image P2 is of a square shape as a whole as with the first panoramic image P1. The center of the square shape corresponds to the point F, and the point B which is opposite to the point F on the sphere S corresponds to four corners of the square shape. In other words, the four vertexes of the second panoramic image P2 correspond to the single point B on the sphere S. The midpoint of the left side of the square shape corresponds to the point L, the midpoint of the upper side thereof to the point U, the midpoint of the right side thereof to the point R, and the midpoint of the lower side thereof to the point D. Of the four vertexes which correspond to the point B, the upper right vertex is defined as a point $B_1$, the lower right vertex as a point $B_2$, the lower left vertex as a point $B_3$, and the upper left vertex as a point $B_4$.

In the second panoramic image P2, the frontal region of the sphere S is transformed into a square shape RULD depicted in FIG. 5. In this square shape, the lines of latitude extend parallel to each other in the horizontal directions (directions parallel to the straight line LR), whereas the lines of longitude extend radially from the point U, and bend at positions where they intersect with the straight line RL and then extend to the point D.

On the other hand, the back region of the sphere S is divided into four areas each transformed into a transformed area shaped as a rectangular equilateral triangle and disposed outside of the square shape RULD. The positions where the transformed areas are disposed are determined such that contiguous areas on the sphere S are also adjacent to each other in the second panoramic image P2. Specifically, in the second panoramic image P2, as with the first panoramic image P1, the eight divided areas $A_9$ through $A_{16}$ into which the surface of the sphere S is divided are transformed into transformed areas $A_9$ through $A_{16}$ each shaped as a rectangular equilateral triangle, making up a square panoramic image where they keep their adjacent relationship on the sphere S. In the transformed areas $A_{13}$ through $A_{16}$ that are disposed outside of the square shape RULD, lines of latitude of the back coordinate system are juxtaposed parallel to the straight line LR as is the case with the lines of latitude of the frontal coordinate system.

The associated relationship between positional coordinates on the surface of the sphere S and positional coordinates in the second panoramic image P2 will be described below. It is assumed that the positional coordinates in the second panoramic image P2 are represented by an orthogonal coordinate system where the x-axis extends in the horizontal directions, the y-axis extends in the vertical directions, and the origin is located at the central position, as depicted in FIG. 5. In the orthogonal coordinate system, the right side of the second panoramic image P2 is indicated by x=1, the left side thereof by x=−1, the upper side thereof by y=1, and the lower side thereof by y=−1.

In this case, a latitude θ and a longitude φ on the surface of the sphere S are expressed by the following equations using variables u and v:

$$\begin{cases} \theta = v \cdot \dfrac{\pi}{2} \\ \phi = \dfrac{u}{1-v} \cdot \dfrac{\pi}{2} \end{cases} \qquad \text{[Equation 3]}$$

where u and v are expressed by the following equations depending on positional coordinates (x, y) in the second panoramic image P2:

Transformed areas $A_9$, $A_{10}$, $A_{11}$, and $A_{12}$:

$$u=x,\ v=y$$

Transformed area $A_{13}$:

$$u=x-1,\ v=y-1$$

Transformed area $A_{14}$:

$$u=1-x,\ v=-y-1$$

Transformed area $A_{15}$:

$$u=1+x,\ v=1+y$$

Transformed area $A_{16}$:

$$u=-x-1,\ v=1-y \qquad \text{[Equation 4]}$$

The associated relationship between positions on the sphere S and positions in the second panoramic image P2 is defined by these equations. According to the second example, however, as described above, the latitudes θ and longitudes φ in the frontal region are defined by the frontal coordinate system, whereas the latitudes θ and longitudes φ in the back region are defined by the back coordinate system. In the second panoramic image P2, latitudes θ in each of the divided areas are also linearly related to both x and y.

Except the points (x=1, x=−1, y=1, y=−1) on the outer circumference of the second panoramic image P2, the positional coordinates on the sphere S and the positional coordinates in the second panoramic image P2 are also held in one-to-one correspondence with each other. Furthermore, pixels that are adjacent to each other in the second panoramic image P2 correspond to areas that are adjacent to each other in the sphere S. The points on the outer circumference of the second panoramic image P2 are contiguous, on the sphere S, to locations on corresponding same sides in case each side of the square shape is folded back on itself about the midpoint. As with the first panoramic image P1, the second panoramic image P2 offers an image quality essentially equivalent to that of the equidistant cylindrical image P0 with one-half of the number of pixels of the equidistant cylindrical image P0.

According to the second example, unlike the first panoramic image P1, the scene on the frontal side as viewed from the observer (the scene projected onto a hemispherical surface about the point F) is transformed, without being divided, into a square shape whose center is aligned with the center of the second panoramic image P2. Therefore, the second panoramic image P2 is suitable for use in an application where a frontal scene, rather than a back scene, is to be presented to the user.

As described above, in the first panoramic image P1, the point D is disposed at the center and the point U opposite thereto corresponds to the vertexes at the four corners, whereas in the second panoramic image P2, the point F is disposed at the center and the point B opposite thereto corresponds to the vertexes at the four corners. In other words, the first panoramic image P1 and the second panoramic image P2 are different from each other as to the direction of transformation from the sphere S into a planar panoramic image P. However, they are similar to each other with respect to the contents of transformation. Specifically, in either case, each of the eight divided areas on the spherical surface that are divided by the three planes that pass through the center of the sphere S and that are orthogonal to each other is transformed into a transformed area shaped as a rectangular equilateral triangle. The difference between the amounts of information of pixels is thus reduced. Each of the divided areas is transformed into a rectangular equilateral triangle because the panoramic image P can be shaped as a square by juxtaposing eight rectangular equilateral triangles. If the panoramic image P may be of another shape (e.g., a rectangle), then it is still possible to reduce the difference between the amounts of information of pixels compared with the equidistant cylindrical image P0 even if each of the divided areas is transformed into a triangle that is not a rectangular equilateral triangle (a right-angled triangle or the like).

Next, the third example of the image format of the panoramic image P in the present embodiment will be described below. The panoramic image P according to the third example will hereinafter be referred to as a third panoramic image P3. For the convenience of illustration, according to the third example, as with the second example, the surface of the sphere S is divided into eight divided areas $A_9$ through $A_{16}$. Moreover, positional coordinates on the sphere S shall be expressed by latitudes θ and longitudes φ defined in the similar manner to the frontal coordinate system according to the second example. In other words, according to the third example, unlike the second example, the positions on the surface of the sphere S are expressed by a single coordinate system over the entire surface of the sphere S.

Figure 6:
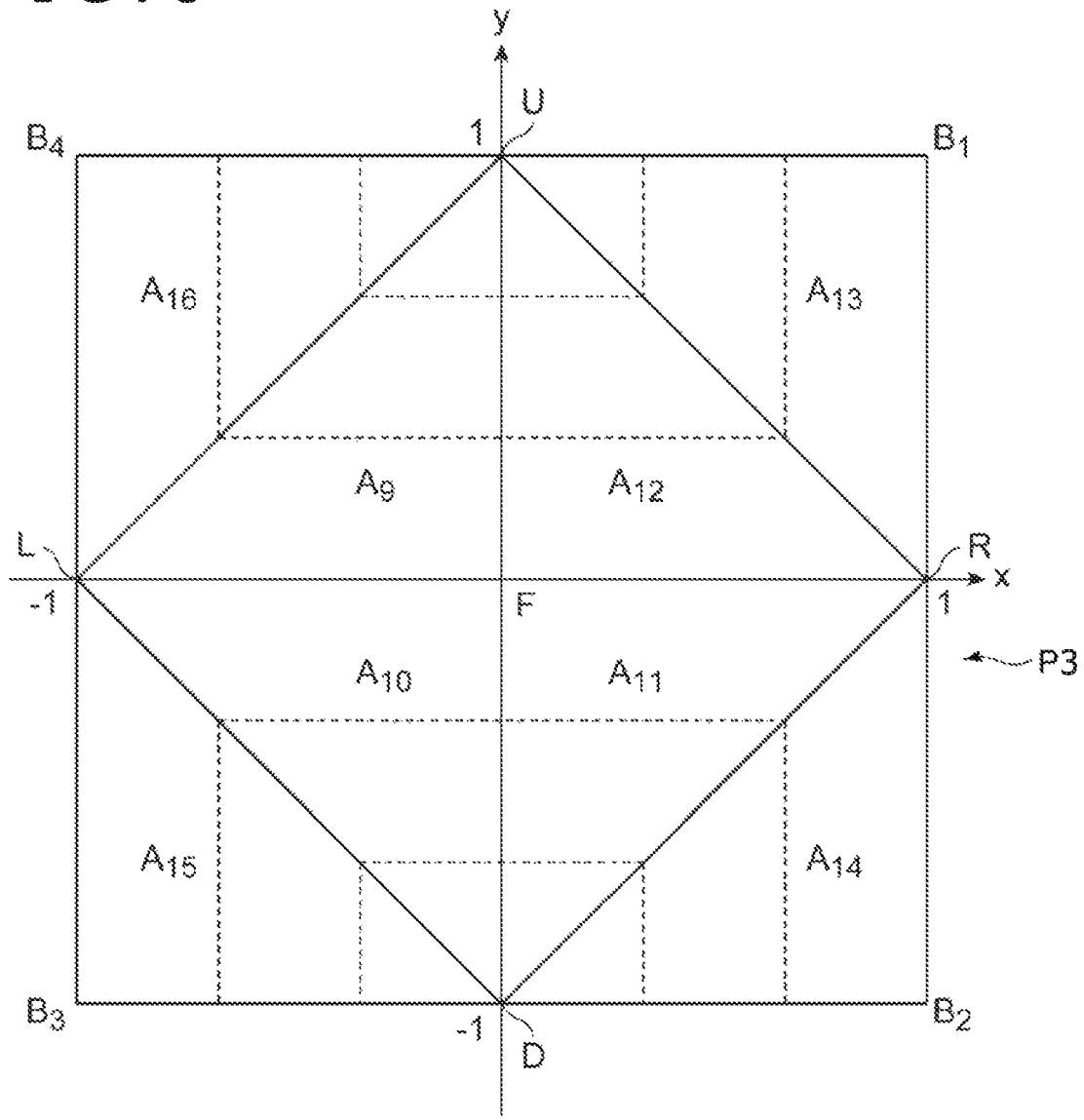
FIG. 6 is a diagram depicting a panoramic image according to a third example.

FIG. 6 depicts the third panoramic image P3 including a scene projected onto the sphere S. As depicted in FIG. 6, in the third panoramic image P3, each of the eight divided areas $A_9$ through $A_{16}$ is transformed into a rectangular equilateral triangle, as with the second panoramic image P2, and the rectangular equilateral triangles are placed in the same positions as with those of the second panoramic image P2. Furthermore, the divided areas $A_9$ through $A_{12}$ are transformed into transformed areas $A_9$ through $A_{12}$ in the third panoramic image P3 by the similar transformation equations to those for the second panoramic image P2. In other words, providing the same scene is to be expressed, the image data in square shapes URDL in the second panoramic image P2 and the third panoramic image P3 are in agreement with each other.

On the other hand, in the third panoramic image P3, the divided areas $A_{13}$ through $A_{16}$ are transformed into transformed areas which are in the similar positions and shapes to those in the second panoramic image P2. However, positions in the divided areas are transformed into positions in the corresponding transformed areas by transformation equations different from those for the second panoramic image P2. As a result, in the third panoramic image P3, lines of latitude at θ>0 are of an upwardly open U shape and, conversely, lines of latitude at θ<0 are of a downwardly open U shape, as indicated by the dotted lines in FIG. 6.

The associated relationship between positional coordinates on the surface of the sphere S and positional coordinates in the third panoramic image P3 will be described below. It is assumed that the positional coordinates in the third panoramic image P3 are represented by an orthogonal coordinate system where the x-axis extends in the horizontal directions, the y-axis extends in the vertical directions, and the origin is located at the central position as is the case of the first panoramic image P1 and the second panoramic image P2.

In this case, a latitude θ and a longitude φ on the surface of the sphere S are expressed by the following equations using variables u, v, and a:

$$\begin{cases} \theta = v \cdot \dfrac{\pi}{2} \\ \phi = \dfrac{u}{1-v} \cdot \dfrac{\pi}{2} + a \end{cases}$$ [Equation 5]

where u, v, and a are expressed by the following equations depending on positional coordinates (x, y) in the third panoramic image P3:

Transformed areas $A_9$, $A_{10}$, $A_{11}$, and $A_{12}$:

$u=x, v=y, a=0$

Transformed area $A_{13}$:

$u=y-1, v=-x+1, a=\pi$

Transformed area $A_{14}$:

$u=-y-1, v=x-1, a=\pi$

Transformed area $A_{15}$:

$u=y+1, v=-x-1, a=\pi$

Transformed area $A_{16}$:

$u=-y+1, v=x+1, a=\pi$ [Equation 6]

The associated relationship between positions on the sphere S and positions in the third panoramic image P3 is defined by these equations. In the third panoramic image P3, latitudes θ in each of the divided areas are also linearly related to both x and y.

According to the third example, as with the second example, the scene on the frontal side as viewed from the observer (the scene projected onto a hemispherical surface about the point F) is transformed, without being divided, into a square shape URDL in the third panoramic image P3. Therefore, the third example is suitable for use in an application where a frontal scene is to be presented to the user, compared with the first example. Moreover, since the entire sphere S is defined by one coordinate system and there is no need to switch between latitudes and longitudes, an interpolating process in transforming the equidistant cylindrical image P0 into the panoramic image P is made easy, reducing the processing burden, compared with the second example.

According to the three examples described above, each of the four areas obtained by dividing the surface of the sphere S with two of the three planes, referred to above, that are orthogonal to each other is transformed into an area of square shape. For example, with respect to the first panoramic image P1, the four areas obtained by dividing the sphere S with a vertical plane including the point U, the point $E_1$, the point D, and the point $E_3$ and another vertical plane including the point U, the point $E_2$, the point D, and the point $E_4$ are transformed into four square shapes $E_1U_1E_2D$, $DE_2U_2E_3$, $U_4E_1DE_4$, and $E_4DE_3U_3$. Then, the circumference that is provided by the remaining one of the three planes referred to above which intersects orthogonally with the sphere S is transformed into respective diagonal lines of the four square shapes. For example, in the first panoramic image P1, the diagonal lines of the four square shapes form a square shape $E_1E_2E_3E_4$ corresponding to the horizontal plane. In other words, each of the first panoramic image P1, the second panoramic image P2, and the third panoramic image P3 is constructed by combining pairs of the eight rectangular equilateral triangles into four squares and juxtaposing the four squares in two rows and two columns such that the bases of the rectangular equilateral triangles make up a square.

Figures 7, 8:
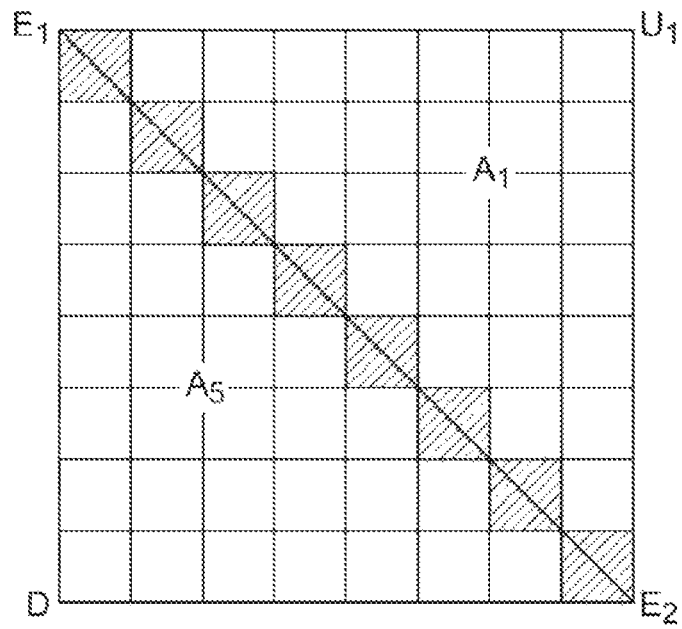
FIG. 7 is a diagram depicting an example of a pixel layout of a panoramic image generated by the image generating apparatus according to the embodiment of the present invention.
FIG. 8 is a diagram depicting an example of a pixel layout of a panoramic image which is of a rectangular shape.

FIG. 7 is a diagram depicting an example of a square shape that is formed by combining two transformed areas each shaped as a rectangular equilateral triangle in the examples described above, and illustrates a pixel layout of the square $E_1U_1E_2D$ in the first panoramic image P1 depicted in FIG. 3. For the sake of brevity, it is assumed that one side of the square shape is made up of eight pixels. Providing one side of the square shape has eight pixels, the number of pixels arrayed on a diagonal line of the square shape is also eight. In FIG. 7, the pixels on the diagonal line are depicted hatched.

In case a rectangular equilateral triangle is placed such that its base lies obliquely, as indicated by the hatched pixels in FIG. 7, the rectangular equilateral triangle is made up of N(N+1)/2 pixels where N represents the number of pixels on its base. When the number of pixels is doubled, N(N+1) is obtained. In other words, if the number of pixels on the base of each rectangular equilateral triangle is to be N, then a rectangular area of N rows and (N+1) columns is required for containing two rectangular equilateral triangles. According to the above examples, however, two rectangular equilateral triangles share a base, as depicted in FIG. 7. Specifically, the pixels on a diagonal line of the square provides the bases of two rectangular equilateral triangular transformed areas. Therefore, a rectangle formed by combining two rectangular equilateral triangles becomes a square of N rows and N columns. When each of the four areas obtained by dividing the sphere S with two planes that are orthogonal to each other is transformed into a square, the entire panoramic image P is of a square shape where the number of pixels in the vertical directions and the number of pixels in the horizontal directions are equal to each other. With this arrangement, a process such as moving image compression is easy to perform.

The square of N rows and N columns may be regarded as being made up of (2N−1) pixel arrays, each including a plurality of pixels arrayed along a straight line parallel to the straight line $E_1E_2$, successively arranged from the upper right corner toward the lower left corner. Specifically, an upper right pixel closest to the point $U_1$ makes up the first pixel array by itself. A next pixel to the left of the upper right pixel and a pixel directly below the upper right pixel make up the second pixel array. The N-th pixel array is made up of the N pixels, depicted hatched in FIG. 7, arrayed from the point $E_1$ to the point $E_2$. The (N+1)th pixel array is made up of (N−1) pixels that are next to the left of the N pixels depicted hatched in FIG. 7. The (2N−1)th pixel array is made up of a lower left pixel closest to the point D. The sum of the pixels that make up those pixel arrays is represented by:

$$1+2+\ldots+(N-1)+N+(N-1)+\ldots+2+1=N^2,$$

which agrees with the number of pixels contained in the square of N rows and N columns.

As described above, straight lines parallel to the straight line $E_1E_2$ correspond to lines of latitude on the sphere S. Consequently, the pixels belonging to one pixel array correspond to areas of the same latitude on the sphere S. It can thus be seen that the visual field range of 180 degrees from the zenith to the nadir of the sphere S is transformed into the (2N−1) pixel arrays in the first panoramic image P1. Moreover, as described above, in the transformation equations for transforming positions on the sphere S into positions in the first panoramic image P1, latitudes θ are linearly related to both x and y. Therefore, the (2N−1) pixel arrays referred to above correspond to mutually equal latitude ranges on the sphere S. In other words, each pixel array corresponds to a strip-like area equivalent to a latitude range of $\pi/(2N-1)$ on the sphere S. From the above transformation equations, the pixels contained in one pixel array correspond to areas that are as wide as each other in the strip-like area on the sphere S. In other words, the pixels contained in a pixel array that corresponds to an area of the same latitude have the same amounts of information as each other. This feature about the transformation between the divided areas and the transformed areas is also applicable to the second panoramic image P2 and the third panoramic image P3 though the pixel arrays therein are oriented differently. Insofar as transformation is performed between positions on the sphere S and positions in the panoramic image P according to the above transformation equations, the difference between the amounts of information carried by the pixels in the panoramic image P is reduced compared with the process of generating transformed areas simply by projecting scenes in the divided areas on the spherical surface onto a plane within the sphere.

While the three examples have been described above, the panoramic image P according to the present embodiment is not limited to those examples, but there are various variations where the coordinate system used for transformation and the layout of the transformed areas in the panoramic image P are changed. In any case, it is possible to generate a square panoramic image P including a whole sky scene by transforming eight divided areas obtained by dividing the surface of the sphere S with three planes that pass through the center of the sphere S and that are orthogonal to each other into transformed areas each shaped as a triangle, and placing the transformed areas on a plane. Moreover, by transforming each divided area that corresponds to ⅛ of the surface of the sphere S into a triangular shape, it is possible to realize a panoramic image P of high image quality with a reduced number of pixels while minimizing a wasteful amount of information per pixel compared with equidistant cylindrical projection.

In the above description, the divided areas on the sphere S are transformed into respective triangular areas, which are placed on a plane, thereby generating a square panoramic image P where the number of pixels in the vertical directions and the number of pixels in the horizontal directions are equal to each other. However, the panoramic image P according to the present embodiment is not limited to such a configuration. In the description of FIG. 7, for example, an area which is ¼ of the surface of the sphere S is transformed into a square of N rows and N columns where two transformed areas share the bases of rectangular equilateral triangles. However, two divided areas may be transformed into areas shaped as rectangular equilateral triangles whose bases are not shared, but are each made up of a pixel array of N pixels. In this case, an area which is ¼ of the sphere S is transformed into a rectangular area of N rows and (N+1) columns, and a panoramic image P is of a rectangular shape of 2N rows and (2N+2) columns as a whole.

For increasing the resolution in directions transverse to the base, an area which is ¼ of the sphere S may be transformed into a rectangular area of N rows and (N+m) columns where m is a natural number of 1 or larger. There is no upper limit for m, but if m is too large, then the data size of the panoramic image P increases. If m is smaller than N, then the image data size can be reduced compared with an equidistant cylindrical image P0 whose resolution in the direction of the base is essentially equivalent. FIG. 8 depicts an example of a rectangle of N rows and (N+m) columns transformed from an area which is ¼ of the sphere S in this example. In this example, the areas (the divided areas $A_1$ and $A_5$) of the sphere S which correspond to the square $E_1U_1E_2D$ in the first panoramic image P1 depicted in FIG. 3 are transformed by a transformation process similar to that for the first panoramic image P1. Moreover, N=8 and m=3 are satisfied in the example depicted in FIG. 8. In this example, the divided areas on the sphere S are transformed into a trapezoidal shape, rather than the triangular shape in the above examples.

In FIG. 8, a pixel group corresponding to areas of the same latitude on the sphere S is labeled with identical numerals. A pixel group, whose corresponding latitudes on the sphere S are equal to each other, in the panoramic image P will hereinafter be referred to as a same-latitude pixel group. The pixels labeled identically in FIG. 8 belong to the identical same-latitude pixel groups. For example, an upper right pixel labelled with "1" in FIG. 8 corresponds to a high-latitude area closest to the zenith (the point U) on the sphere S, and two pixels labelled with "2" make up a same-latitude pixel group corresponding to an immediately lower area surrounding the area corresponding to the pixel labelled with "1" on the sphere S. A same-latitude pixel group labelled with "9" and a same-latitude pixel group labelled with "10" correspond to areas along the horizontal plane on the sphere S. As depicted in FIG. 8, the same-latitude pixel groups provide strip-like pixel arrays along oblique lines oriented from upper left ends toward lower right ends. Same-latitude pixel groups labelled "8" through "11" which correspond to relatively low-latitude areas are made up of a largest number of pixels, and the number of pixels that make up same-latitude pixel groups progressively decreases toward the point U or the point D. In the example depicted in FIG. 8, the number of pixels that expresses a range of 90 degrees along the horizontal plane is N as with the example depicted in FIG. 7. However, the number of pixels that expresses a range of 180 degrees from the point $U_1$ via the point $E_1$ or the point $E_2$ to the point D is (2N−1+m) whereas it is (2N−1) in FIG. 7. In other words, the resolution for expressing the vertical directions of the sphere S increases as much as the number of pixels increases in the horizontal directions by changing the shape of the panoramic image P from a square to a rectangle. Though the panoramic image P is of a horizontally extended shape in this example, it may be of a vertically extended shape.

FIG. 9 depicts another example in which the panoramic image P is formed in a rectangular shape. In this example, the areas which correspond to a square $UFRB_1$ in the third panoramic image P3 depicted in FIG. 6 are transformed by a transformation process similar to that for the third panoramic image P3. As with FIG. 8, the pixels that belong to the identical same-latitude pixel groups are labelled with mutually identical numerals. In the third panoramic image P3, of the transformed areas $A_{12}$ and $A_{13}$ that correspond to ¼ of the surface of the sphere S, an upper left pixel corresponds to areas of the same latitude closest to the point U. In the example depicted in FIG. 9, however, four (i.e., 1+m) pixels labelled "1" make up a high-latitude same-latitude pixel group that is closest to the point U. A same-latitude pixel group labelled with "8" corresponds to areas along the horizontal plane, and is made up of (2N−1+m) pixels. In other words, in FIG. 9, a range of 90 degrees in the vertical directions of the sphere S is expressed by N pixels, and a range of 180 degrees in the horizontal directions is expressed by (2N−1+m) pixels, resulting in an increase in the resolution in the horizontal directions contrary to FIG. 8. In the example depicted in FIG. 9, as with the third panoramic image P3, the same-latitude pixel groups form L-shaped areas. The divided area $A_{13}$ is transformed into a rectangular equilateral triangle similar to that in the third panoramic image P3, and the divided area $A_{12}$ is transformed into a trapezoidal shape.

As illustrated above, the resolution in the vertical directions or the horizontal directions can be increased by forming the panoramic image P in a rectangular shape, compared with forming the panoramic image P in a square shape. In either one of the examples described above, same-latitude pixel groups corresponding to lines of latitude on the sphere S form strip-like areas in the panoramic image P. As can be understood from the description thus far, a line of latitude represents a set of points whose distances from a certain point (hereinafter referred to as an extreme point) on the sphere S are equal to each other. In the first panoramic image P1, the frontal region of the second panoramic image P2, and the third panoramic image P3, the extreme point is the point U and the point D, and lines of latitude correspond to lines of intersection between planes parallel to the horizontal plane on the sphere S and the surface of the sphere S. In the back region of the second panoramic image P2, the point R and the point L serve as the extreme point, and lines of latitude extend along the vertical directions as indicated by the dot-and-dash lines in FIG. 4D. Regardless of what positions and orientations the extreme points and lines of latitude are defined in, the panoramic image P according to the present embodiment is such that providing attention is paid to an arbitrary line of latitude on the sphere S, the number of pixels belonging to a same-latitude pixel group corresponding to that line of latitude is the same as or smaller than the number of pixels belonging to a same-latitude pixel group corresponding to a line of latitude lower than that line of latitude (i.e., a line of latitude closer to the extreme point). Stated otherwise, in the panoramic image P, the number of pixels included in a same-latitude pixel group is progressively smaller at higher latitudes. In the equidistant cylindrical image P0, on the other hand, since any lines of latitude correspond to pixel arrays having the same length that are arranged laterally across the image, the number of pixels belonging to any same-latitude pixel group is constant regardless of latitudes. Inasmuch as the panoramic image P according to the present embodiment is such that, as described above, the number of pixels belonging to a same-latitude pixel group corresponding to a line of latitude at a high latitude is smaller than the number of pixels belonging to a same-latitude pixel group corresponding to a line of latitude at a low attitude, as described above, wasteful information occurring in high-latitude areas in the equidistant cylindrical image P0 is reduced, and an equivalent or higher resolution can be achieved with a reduced number of pixels compared with the equidistant cylindrical image P0.

In the above description, the whole sky scene in its entirety is included in the panoramic image P. However, the panoramic image P according to the present embodiment is not limited to such a configuration. For example, the panoramic image P may not include all the eight transformed areas corresponding to the eight divided areas that are obtained by dividing the surface of the sphere S, but may include only some transformed areas. For example, of the eight divided areas obtained by dividing the surface of the sphere S depicted in FIGS. 4A to 4D, only the four divided areas $A_9$ through $A_{12}$ may be transformed into transformed areas, which may be placed on a plane, thereby providing a panoramic image P. In this manner, the panoramic image P includes only a scene in a frontal hemisphere as viewed from the observation point. The panoramic image P in this case may be equivalent to the square shape RULD that is part of the second panoramic image P2 depicted in FIG. 5. Alternatively, the four divided areas may be arranged to form a rectangle, rather than a square. Furthermore, of the eight divided areas obtained by dividing the sphere S, two divided areas may be transformed into transformed areas each shaped as a rectangular equilateral triangle, making up a square panoramic image P as depicted in FIG. 7.

Moreover, the panoramic image P according to the present embodiment may be formed such that a scene as viewed from the observation point is not projected onto the sphere S in its entirety, but onto a partial range of the sphere S, and at least one of the eight divided areas obtained by dividing the sphere S where the scene is thus projected is transformed into a transformed area. In this example, the scene may be projected onto only a partial range in one of the divided areas, with no scene projected onto another range, and that divided area may be transformed into a transformed area. In such a case, the range onto which no scene is projected may be transformed into pixels having dummy information (e.g., pixels having a pixel value of 0) in the panoramic image P. In this manner, even if there is no information about the scene of a partial range, such as a range at a high latitude close to the nadir, for example, a panoramic image P can be generated by the process according to the present embodiment.

In the case of the third panoramic image P3, since lines of latitude are of a U shape as depicted in FIG. 6, ranges at high latitudes close to the zenith and nadir become rectangular areas in the vicinity of the point U and the point D. If these areas are not necessary, then a panoramic image P obtained by transforming a range of the sphere S exclusive of those portions may be rearranged in a rectangle. The layout of pixel arrays corresponding to the lines of latitude in this case is similar to that depicted in FIG. 9. By thus rearranging a portion exclusive of unnecessary ranges in a rectangular area, it is possible to generate a panoramic image P which does not include pixels having dummy information.

In the above description, latitudes θ as positional coordinates on the surface of the sphere S are linearly related to positional coordinates x and y in the panoramic image P. This means that all the same-latitude pixel groups in the panoramic image P correspond to mutually equal latitude ranges on the sphere S. For example, providing ¼ of the panoramic image P is made up of pixels in 8 rows and 11 columns as depicted in FIG. 8, since a latitude range of 180 degrees is transformed into 18 same-latitude pixel groups, each of the same-latitude pixel groups corresponds to an angle equivalent to a latitude of 10 degrees. Specifically, a same-latitude pixel group labelled "1" corresponds to a range on the sphere S whose latitude ranges from 80 degrees to 90 degrees, a same-latitude pixel group labelled "2" corresponds to a range on the sphere S whose latitude ranges from 70 degrees to 80 degrees, and a same-latitude pixel group labelled "18" corresponds to a range on the sphere S whose latitude ranges from −80 degrees to −90 degrees. With respect to longitude directions, pixels belonging to identical same-latitude pixel groups also correspond to mutually equal longitude ranges. However, the panoramic image P according to the present embodiment is not limited to such a configuration, but latitude ranges and longitude ranges to which pixels correspond may be different from each other.

In particular, with respect to an important area (an area that is assumed to draw user's attention) on the surface of the sphere S, latitude ranges and longitude ranges on the sphere S which correspond to pixels in the panoramic image P may be smaller than those in other areas. By thus changing angular ranges on the surface of the sphere S which correspond to pixels, the resolution of the important area can be made higher than the other areas. In an example, it is conceivable that the user is likely to pay more attention to an area at a low latitude (an area close to the horizontal plane) than to an area at a high latitude (an area close to the zenith or nadir). For this reason, a latitude range per same-latitude pixel group in an attentional range whose latitude covers −45 degrees to 45 degrees is reduced to one-half of a latitude range per same-latitude pixel group in a range whose latitude covers 45 degrees and more and a range whose latitude covers −45 degrees and less. In this fashion, the resolution of an attentional range that corresponds to one-half of the latitude range of 180 degrees can be twice the resolution of other ranges. While latitude ranges corresponding to pixels are changed in two stages in this example, they are not restrictive, but may be changed in more stages. Moreover, longitude ranges that correspond to pixels belonging to same-latitude pixel groups may be changed in the same manner as latitude ranges. The process of thus varying latitude ranges and longitude ranges corresponding to unit pixels is applicable to not only the panoramic image P according to the present embodiment, but also to the equidistant cylindrical image P0.

Next, an arrangement of an image display system 1 that includes an image generating apparatus 10 and an image display control apparatus 20 according to the embodiment of the present invention will be described below.

Figure 10:
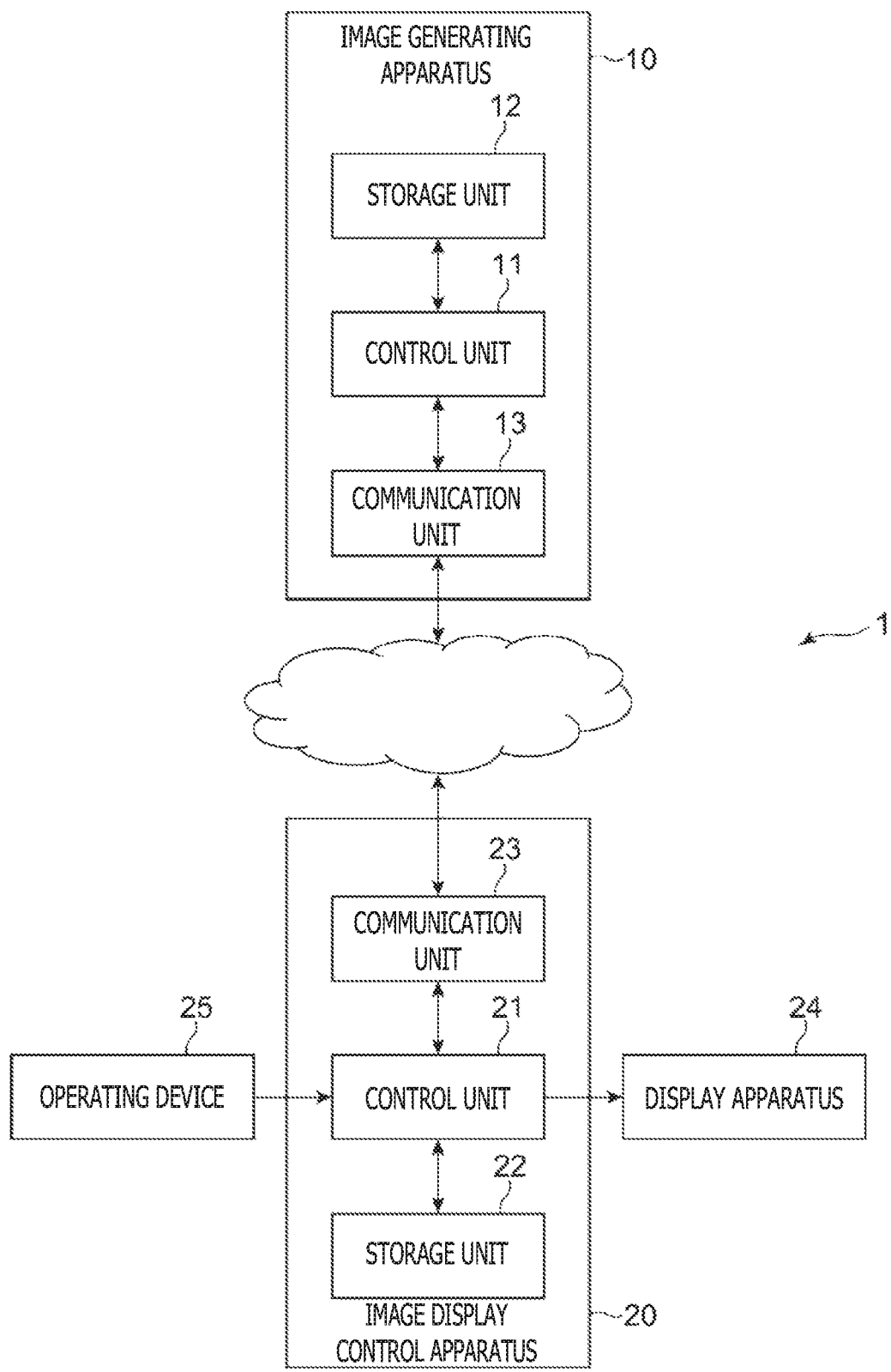
FIG. 10 is a block diagram depicting an arrangement of an image display system including the image generating apparatus and an image display control apparatus according to the embodiment of the present invention.

The image generating apparatus 10 is an information processing apparatus for generating a panoramic image P, and may be a home game machine, a portable game machine, a personal computer, a smartphone, a tablet, or the like, for example. As depicted in FIG. 10, the image generating apparatus 10 includes a control unit 11, a storage unit 12, and a communication unit 13.

The control unit 11 includes at least one processor such as a central processing unit (CPU) or the like, and executes programs stored in the storage unit 12 to perform various information processing processes. According to the present embodiment, in particular, the control unit 11 performs a process of generating a panoramic image P. The storage unit 12 includes at least one memory device such as a random access memory (RAM) or the like, and stores programs executed by the control unit 11 and data processed by the programs. The communication unit 13 is a communication interface such as local area network (LAN) card or the like, and sends data of a panoramic image P to the image display control apparatus 20 via a communication network.

The image display control apparatus 20 is an information processing apparatus for controlling the display of images based on a panoramic image P generated by the image generating apparatus 10, and may be a home game machine, a portable game machine, a personal computer, a smartphone, a tablet, or the like, for example, as is the case with the image generating apparatus 10. The image display control apparatus 20 includes a control unit 21, a storage unit 22, and a communication unit 23. The image display control apparatus 20 is connected to a display apparatus 24 and an operating device 25.

The control unit 21 includes at least one processor such as a CPU or the like, and executes programs stored in the storage unit 22 to perform various information processing processes. According to the present embodiment, in particular, the control unit 21 performs a process of rendering display images based on a panoramic image P. The storage unit 22 includes at least one memory device such as a RAM or the like, and stores programs executed by the control unit 21 and data processed by the programs. The communication unit 23 is a communication interface such as LAN card or the like, and receives data sent from the image generating apparatus 10 via the communication network.

The display apparatus 24 includes a liquid crystal display or the like, and displays images according to a video signal supplied from the image display control apparatus 20. The display apparatus 24 may be a stereoscopic image display apparatus for displaying stereoscopically viewable images supplied from the image display control apparatus 20. Furthermore, the display apparatus 24 may be a head-mounted display apparatus such as a head mount display or the like that the user can wear on its head.

The operating device 25 includes a controller, a pointing device, or the like of a home game machine, and is used for the user to perform various instructing operations on the image generating apparatus 10. The contents of operating inputs applied to the operating device 25 by the user are sent to the image display control apparatus 20 via a wired or wireless link. The operating device 25 may include operating buttons, a touch panel, or the like disposed on the surface of a housing of the image display control apparatus 20.

Figure 11:
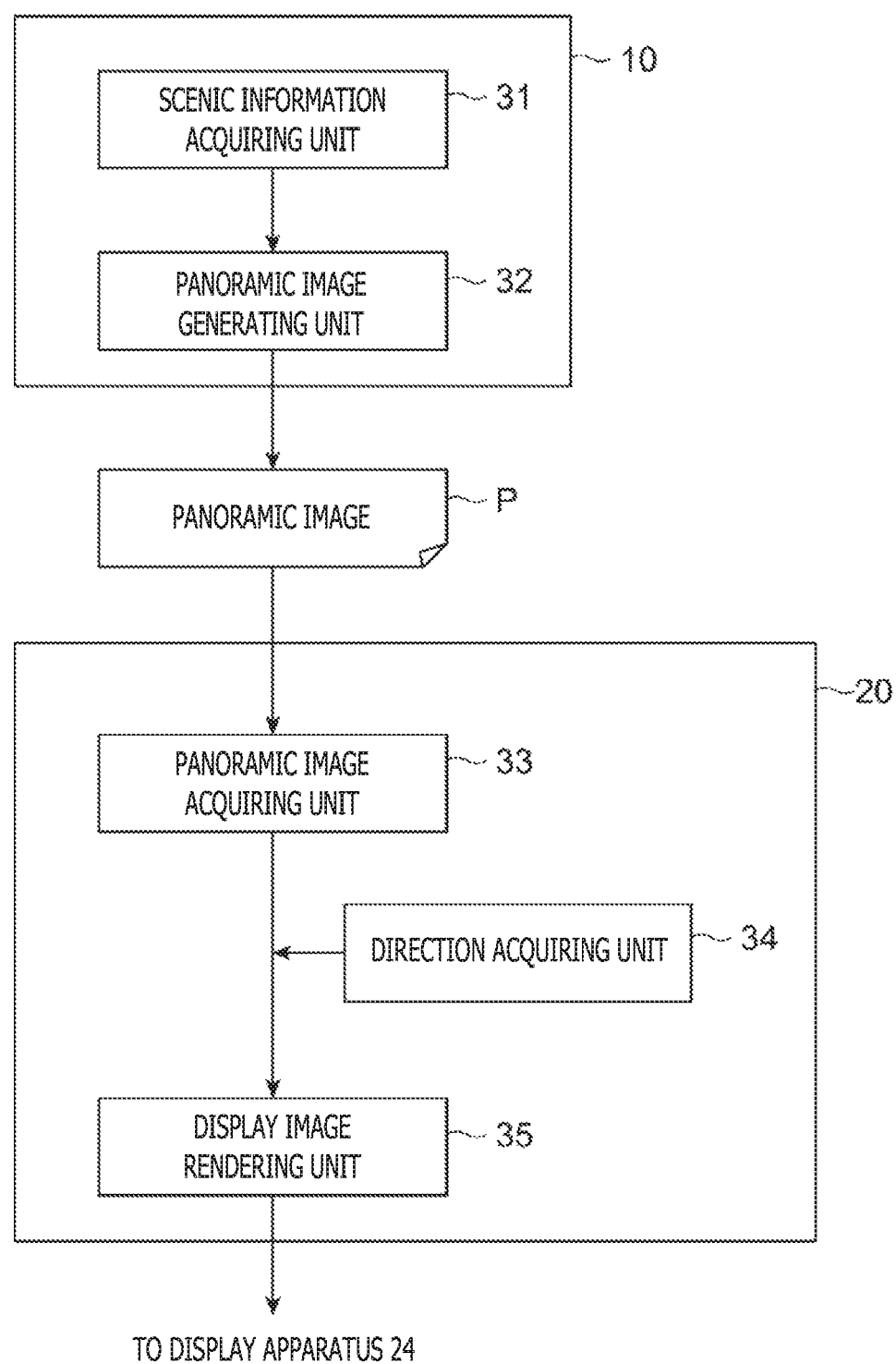
FIG. 11 is a functional block diagram depicting functions of the image display system.

Functions performed by the image generating apparatus 10 and the image display control apparatus 20 will be described below with reference to FIG. 11. As depicted in FIG. 11, the image generating apparatus 10 includes a scenic information acquiring unit 31 and a panoramic image generating unit 32 as functions. These functions are realized when the control unit 11 executes the programs stored in the storage unit 12. The image display control apparatus 20 includes a panoramic image acquiring unit 33, a direction acquiring unit 34, and a display image rendering unit 35 as functions. These functions are realized when the control unit 21 executes the programs stored in the storage unit 22. The programs to be executed by the apparatus may be supplied to the apparatus via a communication network such as the Internet or the like, or may be provided as being stored in an information storage medium such as an optical disk or the like that can be read by a computer.

The scenic information acquiring unit 31 acquires scenic information that serves as original data for generating a panoramic image P. The scenic information represents information required to identify the color (pixel value) of each unit area on the surface of the sphere S in case a whole sky scene as viewed from the observation point is projected onto a hypothetical sphere S. For example, the scenic information may include a panoramic image generated in an image format different from the present embodiment, such as equidistant cylindrical projection. Alternatively, the scenic information may include image data of a panoramic picture captured by a panoramic camera. The scenic information acquiring unit 31 may receive scenic information from another apparatus via a communication network, or may read scenic information from a device such as a camera or the like connected to the image generating apparatus 10, or may read scenic information stored in an information storage medium such as a flash memory or the like.

The panoramic image generating unit 32 generates a panoramic image P using the scenic information acquired by the scenic information acquiring unit 31. The panoramic image P is represented by two-dimensional image data of a projected scene of a whole sky (or part thereof), as described above. Specifically, the panoramic image generating unit 32 generates a panoramic image P by calculating the pixel values of pixels in the panoramic image P on the basis of the scenic information according to calculating equations that represent the associated relationship between points on the sphere S and points in the panoramic image P as described above.

The panoramic image generating unit 32 may generate stereoscopic image data. The image data thus generated may be rectangular image data having an aspect ratio of 1:2 which includes, in a left half thereof, a square panoramic image P for generating a left-eye image and, in a right half thereof, a square panoramic image P for generating a right-eye image. The panoramic image generating unit 32 may generate a panoramic image P as a moving image that changes with time.

The panoramic image generating unit 32 may select an image format from a plurality of image formats such as the first panoramic image P1 and the second panoramic image P2 described above, and generate a panoramic image P according to the selected image format. In this case, the panoramic image generating unit 32 outputs, together with the panoramic image P, information that specifies the image format of the generated panoramic image P.

The panoramic image acquiring unit 33 acquires the panoramic image P generated by the panoramic image generating unit 32 of the image generating apparatus 10. It is assumed here that the panoramic image acquiring unit 33 directly receives the panoramic image P sent from the image generating apparatus 10 via the communication network. However, the acquisition process is not restrictive. The panoramic image acquiring unit 33 may receive the panoramic image P via another apparatus such as a server computer or the like, or may acquire a panoramic image P stored in an information storage medium such as a flash memory or the like by reading it from the information storage medium.

The direction acquiring unit 34 acquires directional information used to determine a visual field range (display range) of a display image to be displayed by the display apparatus 24, on the basis of a user's instruction or the like. The directional information acquired by the direction acquiring unit 34 is used as the image capturing direction of a hypothetical camera at the time the display image rendering unit 35 generates a display image as described later. The image capturing direction is defined by a yaw angle that represents an angle in the horizontal directions and a pitch angle that represents an angle in the vertical directions, for example. The direction acquiring unit 34 may also acquire a roll angle that represents an angle through which the camera rotates about the image capturing direction serving as a rotational axis.

Specifically, the direction acquiring unit 34 acquires directional information by accepting an operating input that is applied to the operating device 25 by the user as indicating a direction. Alternatively, when the user tilts the main body of the image display control apparatus 20, the direction acquiring unit 34 may acquire directional information from a detection result from a motion sensor that is incorporated in the image display control apparatus 20. Therefore, if the image display control apparatus 20 has a small housing as with a smartphone or a tablet, for example, the user can change a visual field range to an arbitrary direction by changing the direction of the image display control apparatus 20. If the display apparatus 24 is a head-mounted display apparatus, then the direction acquiring unit 34 may acquire directional information from a detection result from a motion sensor that is incorporated in the display apparatus 24. The visual field range can thus be changed depending on a change in the direction of the user's head.

The display image rendering unit 35 renders a display image representing a scene in a visual field range that is determined depending on the directional information acquired by the direction acquiring unit 34, on the basis of the panoramic image P acquired by the panoramic image acquiring unit 33, and controls the display apparatus 24 to display the rendered display image. The user can thus browse the scene in the specific visual field range included in the panoramic image P. The user can also browse a scene in an arbitrary direction in the whole sky by changing the visual field range with an operating input or the like applied to the operating device 25.

Specifically, the display image rendering unit 35 places the sphere S in a hypothetical space and places a hypothetical camera at the center of the sphere S. At this time, the hypothetical camera is placed in a direction and tilt determined depending on the directional information acquired by the direction acquiring unit 34. Furthermore, the display image rendering unit 35 applies a texture generated on the basis of the panoramic image P to the inner surface of the sphere S, and renders the way in which the hypothetical camera sees the inner surface of the sphere S to which the texture has been applied, thereby generating a display image. When a texture to be applied to the sphere S is generated, the display image rendering unit 35 refers to the information that specifies the image format, output together with the panoramic image P, and specifies pixels in the panoramic image P that correspond to pixels included in the texture according to calculating equations that are determined depending on the specified image format.

A specific example of a process of applying the texture to the inner surface of the sphere S on the basis of the panoramic image P will be described below. As described above, points on the sphere S are held in one-to-one correspondence with points in the panoramic image P. Therefore, for determining pixel values (colors) of pixels included in a texture (texels), the pixel values of pixels in the panoramic image P that correspond to positions on the sphere S to which the texels are to be applied are referred to. However, due to different resolutions and shapes, texels in the texture and pixels in the panoramic image P may not be in one-to-one correspondence with each other. Accordingly, the display image rendering unit 35 transforms the positions of texels on the sphere S into positions (hereinafter referred to as points X) in the panoramic image P, and determines a plurality of pixels in the vicinity of each of the points X as sampling targets. Then, the display image rendering unit 35 carries out an interpolating process on the pixel values of the pixels determined as the sampling targets, thereby determining the pixel values of the texels.

However, in the panoramic image P, the horizontal directions and vertical directions of the image may not necessarily in agreement with the horizontal directions and vertical directions of the sphere S. For example, with respect to the first panoramic image P1, the horizontal directions (latitude directions) of the sphere S are inclined to the horizontal directions of the image by 45 degrees in any transformed areas. In this case, an ordinary sampling process that uses four pixels in two rows and two columns including a point X, for example, fails to calculate the pixel values of texels appropriately. Accordingly, the display image rendering unit 35 selects pixels as sampling targets according to selection rules determined for the type of the image format of the panoramic image P and each of the transformed areas in the image.

Figure 12:
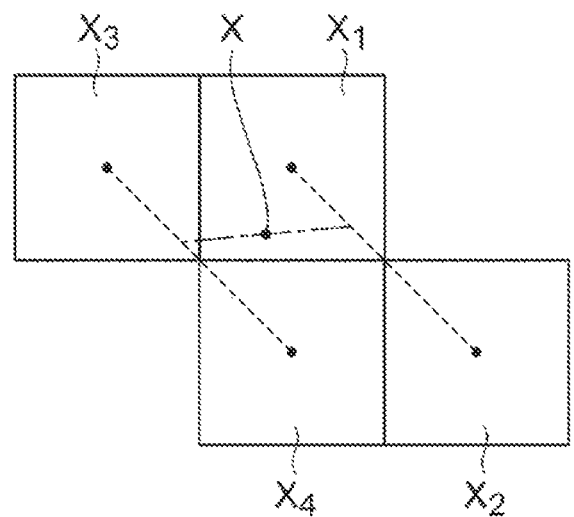
FIG. 12 is a diagram illustrative of a sampling process for rendering a display image.

For example, in the upper right transformed areas $A_1$ and $A_5$ of the first panoramic image P1, the lines of latitude at equal latitudes are straight lines inclined upwardly toward the left by an angle of 45 degrees to the horizontal directions, as indicated by the broken lines in FIG. 3. For performing a sampling process in these transformed areas, the display image rendering unit 35 selects four pixels $X_1$ through $X_4$ juxtaposed along two lines of latitude near a point X, as depicted in FIG. 12. The pair of pixels $X_1$ and $X_2$ and the pair of pixels $X_3$ and $X_4$ are combinations where the pixels correspond to latitudes that are equal to each other. The display image rendering unit 35 obtains an interpolated value I1 depending on the fraction of the longitude of the point X from the pixel values of the pixels $X_1$ and $X_2$, and also obtains an interpolated value I2 depending on the fraction of the longitude of the point X from the pixel values of the pixels $X_3$ and $X_4$. Since the values of the longitudes of the pixels are different from each other, coefficients used for calculating the interpolated values I1 and I2 are different from each other. The display image rendering unit 35 then calculates an interpolated value depending on the fraction of the latitude of the point X from the interpolated values I1 and I2, thereby determining the pixel value of a texel corresponding to the point X. In this manner, the pixel values of texels included in the texture to be applied to the inner surface of the sphere S are calculated.

Figure 13:
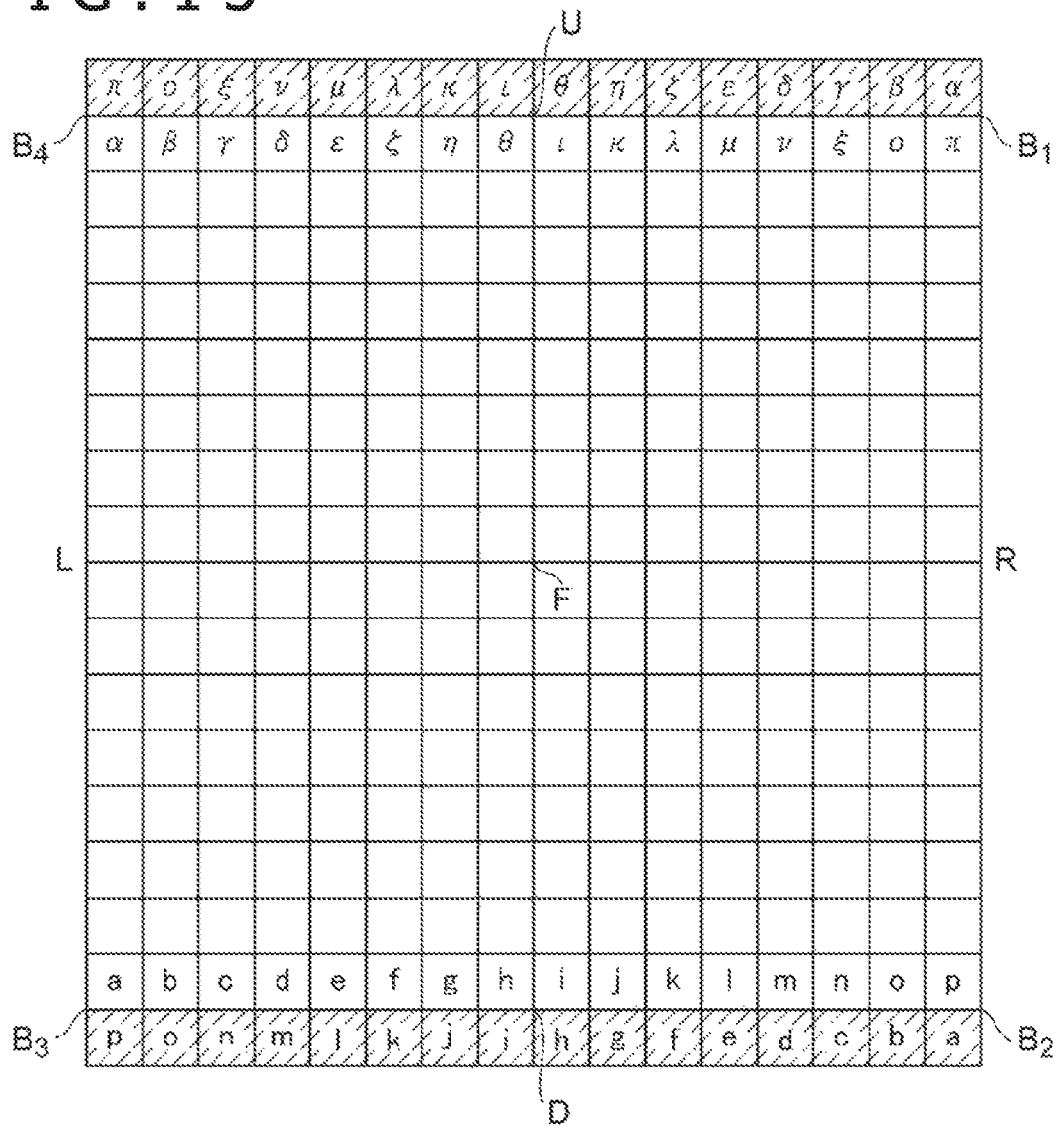
FIG. 13 is a diagram depicting an example of a panoramic image with sampling pixel strings added thereto.

When an interpolating process is carried out on pixels that serve as sampling targets in the vicinity of the outer circumference of the panoramic image P, a plurality of pixels disposed in spaced positions in the image may be selected as sampling targets. This is because, as described above, on the outer circumference of the panoramic image P, pixels that overlap each other when a side is folded back on itself about the midpoint of the side correspond to adjacent positions on the sphere S. In order to eliminate the need to refer to pixels in spaced positions as sampling targets, a sampling pixel array may be placed along the outer circumference of the panoramic image P. The sampling pixel array is a pixel array formed by horizontally or vertically inverting a pixel array on one side of the panoramic image P, and is placed adjacent to the pixel array to be inverted. FIG. 13 depicts an example of a panoramic image P with sampling pixel arrays added thereto. In the example depicted in FIG. 13, the panoramic image P is made up of the third panoramic image P3 shaped as a square of 16 rows and 16 columns and sampling pixel arrays added to upper and lower sides thereof. In FIG. 13, the sampling pixel arrays are depicted hatched. Those pixels which are labelled with identical Greek letters or alphabetical letters have identical pixel values. As indicated by these labels, the uppermost sampling pixel array is a pixel array formed by horizontally inverting the second pixel array from the upper side, and the lowermost sampling pixel array is a pixel array formed by horizontally inverting the second pixel array from the lower side. These sampling pixel arrays are disposed with respect to the pixels on the outer circumference of the original panoramic image P such that adjacent pixels on the sphere S are also adjacent to each other in the panoramic image P. The sampling pixel arrays are effective to make the interpolating process easy though they represent redundant information. Specifically, when an interpolating process is performed on pixels as sampling targets on the second array from the upper side in FIG. 13 or pixels as sampling targets on the second array from the lower side in FIG. 13, other necessary sampling targets may be taken from adjacent sampling pixel arrays, rather than from other places in the panoramic image P. Such an interpolating process using adjacent pixels as sampling targets can be hardware-implemented by a graphic processor or the like. In this case, by adding sampling pixel arrays to the panoramic image P, an interpolating process in a latitude direction including ends of the image can be hardware-implemented, allowing interpolating calculations to be performed at high speeds.

According to the present embodiment, furthermore, the display image rendering unit 35 updates a display image in real time depending on a change in the direction acquired by the direction acquiring unit 34. Specifically, when the direction acquired by the direction acquiring unit 34 changes, the display image rendering unit 35 changes the direction of the hypothetical camera to a direction corresponding to the changed direction. More specifically, when the pitch angle and the yaw angle are changed, the display image rendering unit 35 changes the image capturing direction of the hypothetical camera in conjunction with the angle change. When the roll angle is changed, the display image rendering unit 35 tilts the hypothetical camera about the image capturing direction as the rotational axis in conjunction with the angle change. The visual field range of the hypothetical camera is thus changed in conjunction with the change in the direction acquired by the direction acquiring unit 34. Based on the updated visual field range, the display image rendering unit 35 re-renders the way in which the inner surface of the sphere S is seen to update the display image, and controls the display apparatus 24 to display the updated display image on its screen. The display image rendering unit 35 performs the process of re-rendering (updating) the display image depending on the change in the direction acquired by the direction acquiring unit 34, repeatedly at predetermined time intervals. According this control process, the user is able to browse the scene at an arbitrary position in the whole sky included in the panoramic image P by moving the visual field range.

In the above description, the display image is illustrated as a single planar image. However, the display image rendering unit 35 may render a stereoscopic image. In such a case, the display image rendering unit 35 places two horizontally juxtaposed hypothetical cameras at the center of the hypothetical sphere S. The display image rendering unit 35 then renders the way in which the left hypothetical camera sees the inner surface of the sphere S to which a texture generated on the basis of a panoramic image P for the left eye has been applied, thereby generating a display image for the left eye. Similarly, the display image rendering unit 35 renders the way in which the right hypothetical camera sees the inner surface of the sphere S to which a texture generated on the basis of a panoramic image P for the right eye has been applied, thereby generating a display image for the right eye. These two display images are displayed by the display apparatus 24 which is compatible with stereoscopic images, allowing the user to stereoscopically browse the whole sky scene.

The image generating apparatus 10 according to the embodiment described above is able to generate a panoramic image P of high image quality with a relatively small number of pixels while reducing a wasteful amount of information compared with panoramic images of equidistant cylindrical projection. Furthermore, the image display control apparatus 20 according to the present embodiment is able to generate a display image representing the scene in a visual field range included in the panoramic image P, on the basis of the panoramic image P thus generated, allowing the user to browse the display image.

The embodiment of the present invention is not limited to the details described above. For example, although the image generating apparatus 10 and the image display control apparatus 20 are independent of each other in the above description, one information processing apparatus may generate a panoramic image P and control the display of the panoramic image P.

REFERENCE SIGNS LIST

1 Image display system, 10 Image generating apparatus, 11, 21 Control unit, 12, 22 Storage unit, 13, 23 Communication unit, 20 Image display control apparatus, 24 Display apparatus, 25 Operating device, 31 Scenic information acquiring unit, 32 Panoramic image generating unit, 33 Panoramic image acquiring unit, 34 Direction acquiring unit, 35 Display image rendering unit.

The invention claimed is:

1. An image generating apparatus comprising:
a panoramic image generating unit configured to generate a panoramic image by transforming each of eight divided areas obtained by dividing a surface of a sphere with three planes that pass through a center of the sphere and are orthogonal to each other, to a transformed area shaped as a rectangular equilateral triangle, which is a triangle having one right angle and two sides of equal length, said surface of the sphere having at least a partial area onto which a scene viewed from an observation point is projected, such that a number of pixels belonging to a same-latitude pixel group made up of pixels corresponding to mutually equal latitudes is progressively reduced toward higher latitudes and a plurality of same-latitude pixel groups correspond to mutually equal latitude ranges, and placing the transformed area on a panoramic plane; and
an image output unit configured to output the generated panoramic image, wherein:
said three planes are a horizontal plane, a vertical plane along a predetermined frontal direction, which is a direction to be presented to a user as viewed from the observation point, and a vertical plane along a lateral direction which intersects the predetermined frontal direction, and
said panoramic image generating unit generates the panoramic image by placing the eight transformed areas, each being shaped as the rectangular equilateral triangle, in a square shape as a whole on the panoramic plane, such that a point on the sphere in the predetermined frontal direction is placed at the center of the square shape, a hemisphere structured by the four divided areas around the point in the predetermined frontal direction is transformed to an inscribed square formed by connecting midpoints of the four sides of the square shape.

2. The image generating apparatus according to claim 1, wherein said panoramic image generating unit generates said panoramic image by placing the eight transformed areas such that pixels on each side of the inscribed square are shared by two transformed areas placed with the side of the inscribed square therebetween.

3. The image generating apparatus according to claim 1, wherein said panoramic image generating unit generates said panoramic image by adding a sampling pixel array for use in an interpolation process so as to be adjacent to a pixel array that makes up a side of the outer circumference of said panoramic image.

4. The image generating apparatus according to claim 3, wherein said sampling pixel array is a pixel array formed by inverting the layout of the pixel array that makes up said side.

5. The image generating apparatus according to claim 1, wherein said panoramic image generating unit generates said panoramic image such that an angular range on said sphere which corresponds to pixels in said panoramic image is different depending on a longitude on said sphere.

6. An image display control apparatus comprising:
an acquiring unit configured to acquire a panoramic image by transforming each of eight divided areas obtained by dividing a surface of a sphere with three planes that pass through a center of the sphere and are orthogonal to each other, to a transformed area shaped as a rectangular equilateral triangle, which is a triangle having one right angle and two sides of equal length, said surface of the sphere having at least a partial area onto which a scene viewed from an observation point is projected, such that a number of pixels belonging to a same-latitude pixel group made up of pixels corresponding to mutually equal latitudes is progressively reduced toward higher latitudes and a plurality of same-latitude pixel groups correspond to mutually equal latitude ranges, and placing the transformed area on a panoramic plane; and
a rendering unit configured to render a display image representing the scene on the basis of the acquired panoramic image, and control a display apparatus to display the rendered display image on a screen thereof, wherein:
said three planes are a horizontal plane, a vertical plane along a predetermined frontal direction, which is a direction to be presented to a user as viewed from the observation point, and a vertical plane along a lateral direction which intersects the predetermined frontal direction, and
said acquiring unit further acquires the panoramic image by placing the eight transformed areas, each being shaped as the rectangular equilateral triangle, in a square shape as a whole on the panoramic plane, such that a point on the sphere in the predetermined frontal direction is placed at the center of the square shape, a hemisphere structured by the four divided areas around the point in the predetermined frontal direction is transformed to an inscribed square formed by connecting midpoints of the four sides of the square shape.

7. A method of generating an image, comprising:
generating a panoramic image by transforming each of eight divided areas obtained by dividing a surface of a sphere with three planes that pass through a center of the sphere and are orthogonal to each other, to a transformed area shaped as a rectangular equilateral triangle, which is a triangle having one right angle and two sides of equal length, said surface of the sphere having at least a partial area onto which a scene viewed from an observation point is projected, such that a number of pixels belonging to a same-latitude pixel group made up of pixels corresponding to mutually equal latitudes is progressively reduced toward higher latitudes and a plurality of same-latitude pixel groups correspond to mutually equal latitude ranges, and placing the transformed area on a panoramic plane; and outputting the generated panoramic image, wherein:

said three planes are a horizontal plane, a vertical plane along a predetermined frontal direction, which is a direction to be presented to a user as viewed from the observation point, and a vertical plane along a lateral direction which intersects the predetermined frontal direction, and said generating the panoramic image further includes placing the eight transformed areas, each being shaped as the rectangular equilateral triangle, in a square shape as a whole on the panoramic plane, such that a point on the sphere in the predetermined frontal direction is placed at the center of the square shape, a hemisphere structured by the four divided areas around the point in the predetermined frontal direction is transformed to an inscribed square formed by connecting midpoints of the four sides of the square shape.

8. A non-transitory, computer readable storage medium containing a computer program, which when executed by a computer, causes the computer to carry out actions, comprising:

generating a panoramic image by transforming each of eight divided areas obtained by dividing a surface of a sphere with three planes that pass through a center of the sphere and are orthogonal to each other, to a transformed area shaped as a rectangular equilateral triangle, which is a triangle having one right angle and two sides of equal length, said surface of the sphere having at least a partial area onto which a scene viewed from an observation point is projected, such that a number of pixels belonging to a same-latitude pixel group made up of pixels corresponding to mutually equal latitudes is progressively reduced toward higher latitudes and a plurality of same-latitude pixel groups correspond to mutually equal latitude ranges, and placing the transformed area on a panoramic plane; and outputting the generated panoramic image, wherein:

said three planes are a horizontal plane, a vertical plane along a predetermined frontal direction, which is a direction to be presented to a user as viewed from the observation point, and a vertical plane along a lateral direction which intersects the predetermined frontal direction, and said generating the panoramic image further includes placing the eight transformed areas, each being shaped as the rectangular equilateral triangle, in a square shape as a whole on the panoramic plane, such that a point on the sphere in the predetermined frontal direction is placed at the center of the square shape, a hemisphere structured by the four divided areas around the point in the predetermined frontal direction is transformed to an inscribed square formed by connecting midpoints of the four sides of the square shape.

9. A non-transitory, computer readable storage medium containing image data resulting from a process including:

generating a panoramic image by transforming each of eight divided areas obtained by dividing a surface of a sphere with three planes that pass through a center of the sphere and are orthogonal to each other, to a transformed area shaped as a rectangular equilateral triangle, which is a triangle having one right angle and two sides of equal length, said surface of the sphere having at least a partial area onto which a scene viewed from an observation point is projected, such that a number of pixels belonging to a same-latitude pixel group made up of pixels corresponding to mutually equal latitudes is progressively reduced toward higher latitudes and a plurality of same-latitude pixel groups correspond to mutually equal latitude ranges, and placing the transformed area on a panoramic plane; wherein:

said three planes are a horizontal plane, a vertical plane along a predetermined frontal direction, which is a direction to be presented to a user as viewed from the observation point, and a vertical plane along a lateral direction which intersects the predetermined frontal direction, and said generating the panoramic image further includes placing the eight transformed areas, each being shaped as the rectangular equilateral triangle, in a square shape as a whole on a panoramic plane, such that a point on the sphere in the predetermined frontal direction is placed at the center of the square shape, a hemisphere structured by the four divided areas around the point in the predetermined frontal direction is transformed to an inscribed square formed by connecting midpoints of the four sides of the square shape.

* * * * *